US012194774B2

(12) United States Patent
Ahmed et al.

(10) Patent No.: US 12,194,774 B2
(45) Date of Patent: Jan. 14, 2025

(54) APPLICATOR FOR HAZARDOUS MATERIALS

(71) Applicant: Henkel AG & Co. KGaA, Duesseldorf (DE)

(72) Inventors: Bashir M. Ahmed, Rochester, MI (US); Omar L. Abu-Shanab, Rochester Hills, MI (US); Kristina M. Tkacz, Southgate, MI (US); Ryan M. Cooke, Shelby Township, MI (US); Tsehaye N. Eyassu, Sterling Heights, MI (US); Ming Siong Kam, Singapore (SG); Marc Gomez, Dublin, NH (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/453,513

(22) Filed: Nov. 4, 2021

(65) Prior Publication Data

US 2022/0055395 A1 Feb. 24, 2022

Related U.S. Application Data

(63) Continuation of application No. PCT/US2020/032206, filed on May 8, 2020.

(60) Provisional application No. 62/846,331, filed on May 10, 2019.

(51) Int. Cl.

| | |
|---|---|
| ***B43K 8/06*** | (2006.01) |
| ***B05D 1/28*** | (2006.01) |
| ***B05D 7/24*** | (2006.01) |
| ***B43K 5/18*** | (2006.01) |

(52) U.S. Cl.
CPC .................. *B43K 8/06* (2013.01); *B05D 1/28* (2013.01); *B43K 5/1845* (2013.01); *B05D 7/24* (2013.01)

(58) Field of Classification Search
CPC ........ B43K 1/006; B43K 1/12; B43K 5/1836; B43K 5/1845; B43K 5/1854; B43K 13/005
USPC .................................................. 401/206–207
See application file for complete search history.

(56) References Cited

U.S. PATENT DOCUMENTS 193,381 A * 7/1877 Newton .................... C22B 3/10 401/206
1,687,647 A 10/1928 Garvey
4,568,214 A * 2/1986 Abe .......................... B43K 8/02 401/199
4,685,820 A 8/1987 Kremer et al.
4,776,718 A * 10/1988 Heinzmann .............. B43K 8/16 401/292
4,792,252 A 12/1988 Kremer et al.
4,848,947 A 7/1989 Kremer et al.
4,940,351 A 7/1990 Konose
(Continued)

FOREIGN PATENT DOCUMENTS

CN 2430690 Y 5/2001
CN 1336877 A 2/2002
(Continued)

OTHER PUBLICATIONS

International Search Report for International Application No. PCT/US2020/032206, mailed Aug. 7, 2020.

*Primary Examiner* — David P Angwin
*Assistant Examiner* — Bradley S Oliver
(74) *Attorney, Agent, or Firm* — Mary K. Cameron

(57) ABSTRACT

Pen-type hazardous material applicators are provided useful in applying metal pretreatment material to intricate geometries, such as blind holes, through holes, rivets, crevices, chamfers, counterbores, countersinks and other difficult to access surfaces are provided.

16 Claims, 12 Drawing Sheets

(56) References Cited

U.S. PATENT DOCUMENTS

| | | | | | |
|---|---|---|---|---|---|
| 5,555,673 | A | * | 9/1996 | Smith | A01M 21/043 401/206 |
| 5,702,759 | A | | 12/1997 | White et al. | |
| 6,217,935 | B1 | | 4/2001 | Hubbell | |
| 7,988,376 | B2 | | 8/2011 | Todd | |
| 2008/0166177 | A1 | * | 7/2008 | Alghabban | B43K 1/12 401/198 |
| 2011/0158738 | A1 | | 6/2011 | Bainbridge et al. | |
| 2017/0327955 | A1 | | 11/2017 | Smith et al. | |

FOREIGN PATENT DOCUMENTS

| | | | | | |
|---|---|---|---|---|---|
| CN | 1833879 | A | | 9/2006 | |
| CN | 1910057 | A | | 2/2007 | |
| CN | 201168679 | Y | | 12/2008 | |
| CN | 107554133 | A | | 1/2018 | |
| CN | 207872556 | U | | 9/2018 | |
| DE | 3303341 | A1 | | 8/1984 | |
| FR | 2612089 | A1 | * | 9/1988 | B43K 1/12 |
| JP | H04108021 | U | | 9/1992 | |
| JP | 06007985 | U | | 2/1994 | |
| JP | H0655127 | A | | 3/1994 | |
| JP | H06170320 | A | | 6/1994 | |
| JP | H07223396 | A | | 8/1995 | |
| JP | H09253567 | A | | 9/1997 | |
| JP | 10151393 | A | | 6/1998 | |
| JP | H1162212 | A | | 3/1999 | |
| JP | 2004321845 | A | | 11/2004 | |
| KR | 1020130051391 | A | | 5/2013 | |
| WO | 2017132221 | A1 | | 8/2017 | |

* cited by examiner

FIG. 7
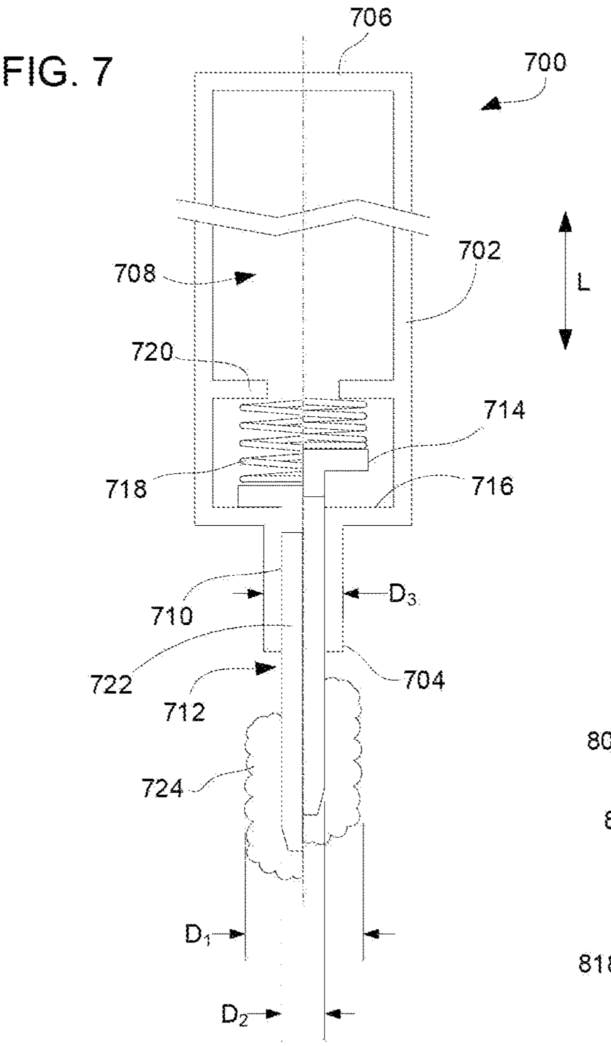
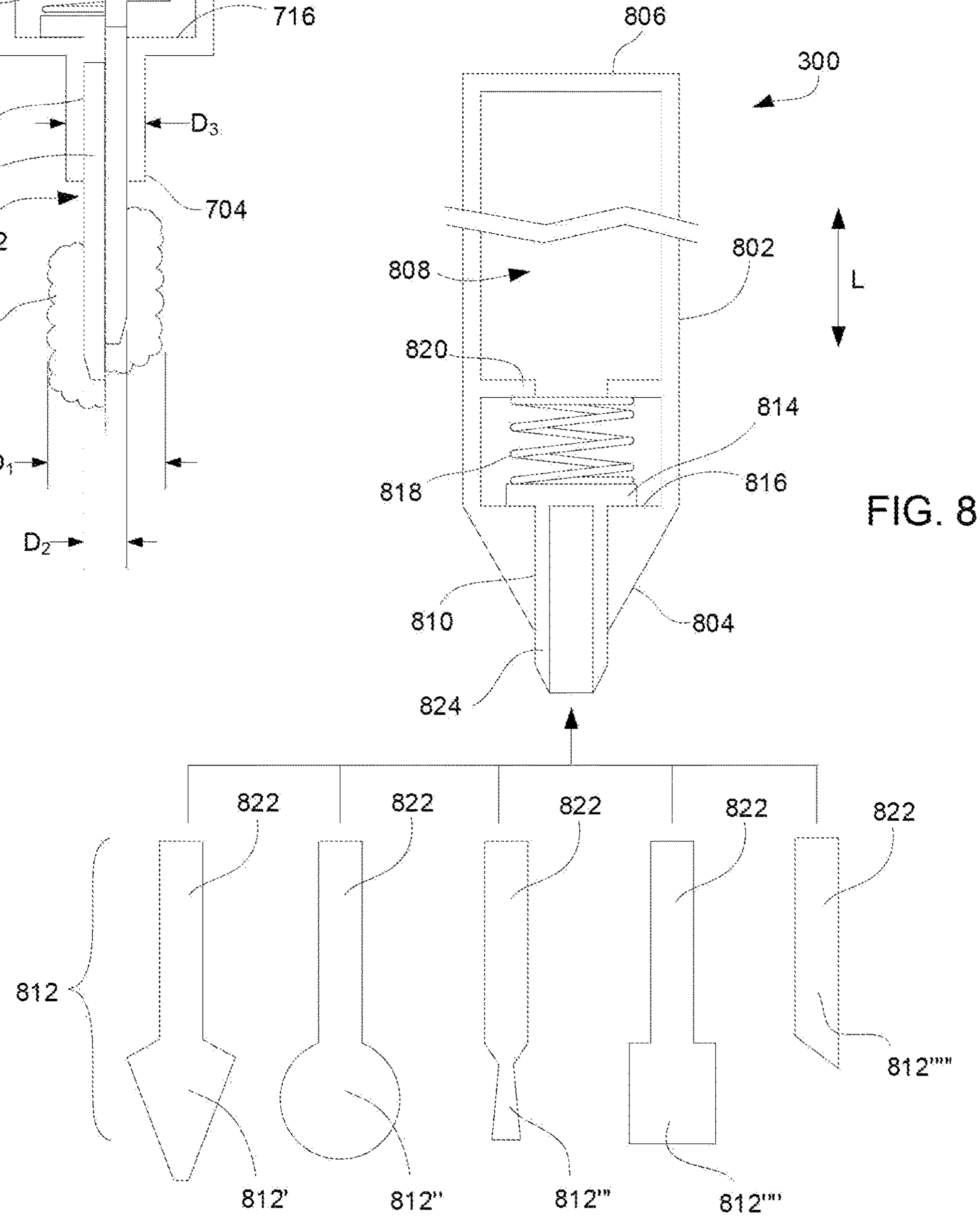
FIG. 8

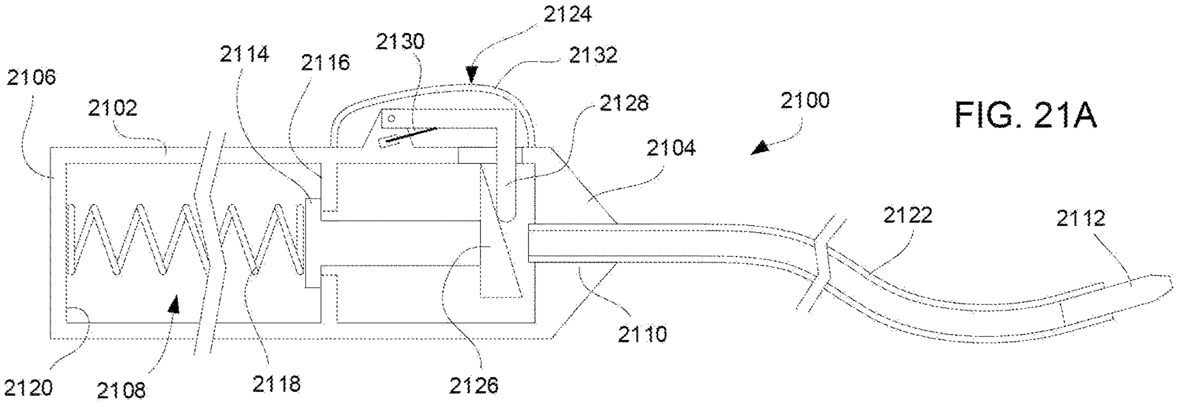
FIG. 21A
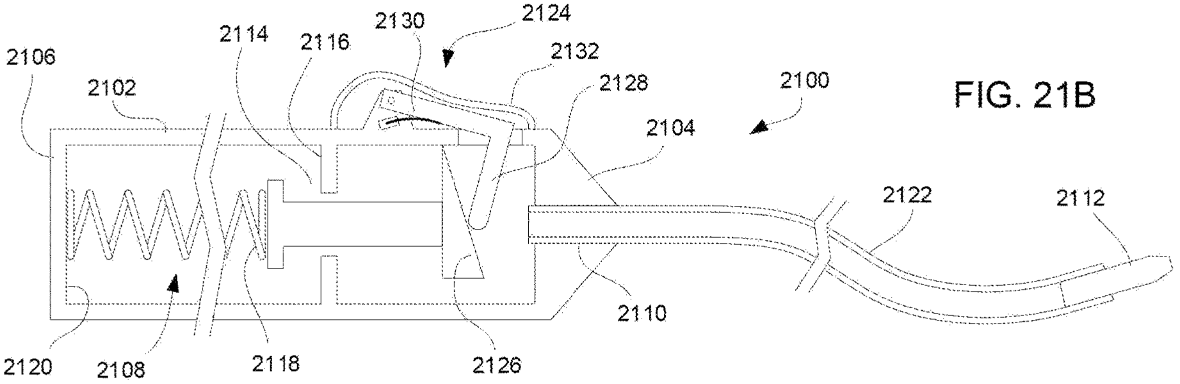
FIG. 21B
FIG. 22A
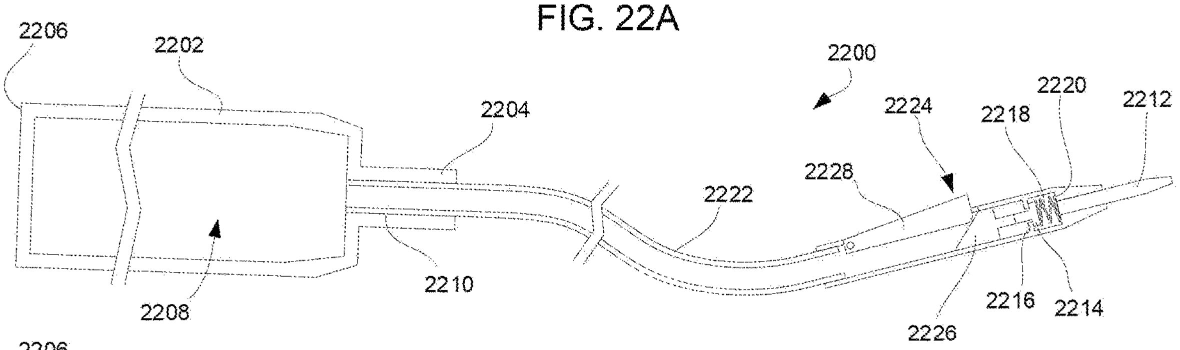
FIG. 22B
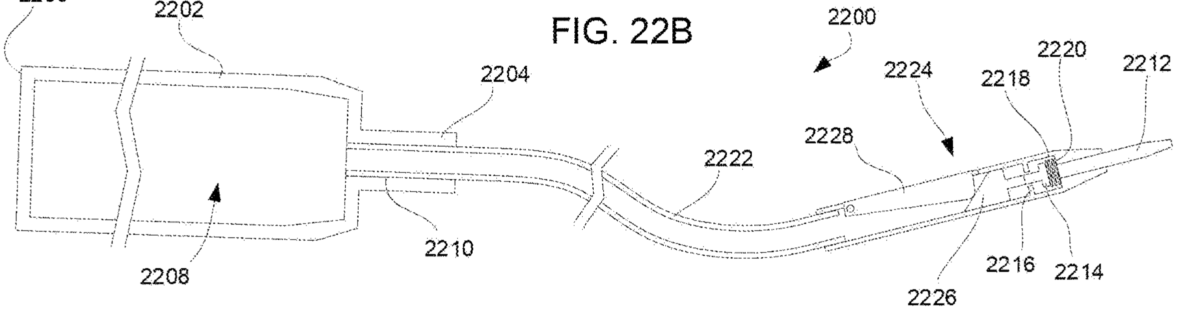

APPLICATOR FOR HAZARDOUS MATERIALS

TECHNICAL FIELD

The inventions described herein relate to the field of applicators for hazardous material, and particularly applicators for dispensing discrete and finely-controlled volumes of such materials.

BACKGROUND

Many chemical applicators and application methods are known. These apparatus and techniques include, for example, spraying systems, pumping systems, immersion baths and the like. Different types of applicators include fibrous markers, felt tip pens, capillary tube pens and the like.

Continuing efforts have been made in the past to improve the usability and safety of chemical application systems and methods when the flowable material is hazardous, toxic, or otherwise offensive. Particularly, in the field of metal coating and treating, such efforts have involved developing systems where the user is physically removed from the article to be treated or coated by employing such devices as spray-booths and immersion baths. A major drawback of such a system is that minor defects in the coating or treatment are difficult to repair and require the entire article to be completely reimmersed or recoated. This process can be particularly time consuming and expensive, since a small defect in the coating will require the expenditure of enough chemical or flowable material to re-treat the entire article.

Typically, aluminum or other metal parts for use in commercial and military systems are fabricated, and then their surfaces are chemically treated to prevent corrosion, using conventional batch processing techniques. This chemical treatment process is quite important in applications that require electrical and thermal insulation or conductivity, for example. After chemical treatment, however, many parts become scratched during subsequent handling or processing steps, which can remove a portion of the chemically treated corrosion protection layer from the surface of the parts. Thus, it might be necessary to treat the scratched areas to return the surfaces to a condition of complete chemically treated corrosive protection.

The conventional method of repairing the scratched surface is to obtain a bottle of coating solution, and then using cotton balls, Q-tips, rags, or sponges, and the like, rub or otherwise apply the coating solution over the scratched areas until the scratch is fully coated. In many cases, the shape of the parts creates many problems in applying the coating solution to the surface.

The coating solution may be and often is a corrosive, hazardous material, since it may contain, for example, quantities of chromic acid, heavy metals, fluoride, ferricyanide, and ferrocyanide. Conventional procedures typically apply excessive quantities of the coating solution, and often result in spillage, creating a hazardous condition in the treatment area. The conventional process is messy, and much of the coating solution is wasted. The cotton balls, Q-tips, rags, or sponges, and the like which are used to apply the coating solution or to clean it up, become hazardous waste as a result of their use and thus present disposal problems.

Generally, the coating solutions or flowable materials are of two types: those that require rinsing to remove excess coating material, and those that do not require rinsing. The former may require rinsing because they tend to form crystals that produce an undesirable surface roughness and present a hazard because these crystals, as well as any residual coating, are generally highly active, i.e., pH 1.5-4.5. Rinsing is necessary but creates rinse water that is corrosive because it is acidic, and may be environmentally damaging or toxic as well, and this poses a disposal problem. No-rinse (NR) coating materials do not form crystals, can be formulated to be self-levelling, and do not require rinsing for those reasons.

The inefficiency of earlier coating systems' attempts to address minor defects in the coating has been addressed, to some degree, by the Applicant's previous development of hand-held pen-type applicators for use in applying corrosive, hazardous, or other chemical coatings solutions to scratched surfaces. Specifically, U.S. Pat. Nos. 5,702,759 and 6,217,935, which are incorporated herein by reference, disclose applicators and methods for using the same to dispense various chemicals. Devices using such technology have been found to be most useful for touching up scratches on planar conversion coated aluminum surfaces. The advent of these marker- or pen-type dispensers has improved the efficiency and speed at which minor defects in coated metal surfaces can be addressed, and provide enhanced user and environmental safety by helping to insulate users from the active chemical.

While the pen-type dispensers noted above have improved the industry, the inventors have found that coating surfaces having more intricate geometries than planar surfaces has remained problematic. Thus, the inventors have determined that the field still wants for improved technology in pen-type hazardous material applicators useful in improving coating non-planar or intricate geometries, particularly for applications having blind holes, through holes, rivets, crevices, chamfers, counterbores, countersinks and other difficult to access surfaces.

This description of the background is provided to assist with an understanding of the following explanations of exemplary embodiments, and is not an admission that any or all of this background information is necessarily prior art.

SUMMARY OF THE INVENTION

The various embodiments described herein are intended to address, or ameliorate, one or more of the deficiencies of the existing pen-type applicator systems and may include features that comprise, consist essentially of or consist of means for supporting and/or increasing a stiffness of an applicator wick, means for regulating a volume of flow from the applicator chamber containing flowable material to the wick, and/or means for positioning the wick at a nonzero angle relative to at least a portion of an applicator housing. Various embodiments of Applicants' applicators are useful in applying material to intricate geometries, particularly for applications having by way of non-limiting example, blind holes, through holes, rivets, crevices, chamfers, counterbores, countersinks and other difficult to access surfaces.

According to one aspect of the invention ("Aspect 1"), an applicator for hazardous material is provided comprising: a housing (302, 402, 502, 602, 702, 802, 902, 1002, 1102, 1902) having a chamber (308, 408, 508, 608, 708, 808, 1008, 1108), a discharge port (310, 410, 510, 610, 710, 810, 1010, 1110), and a valve (314, 414, 514, 614, 714, 814, 1014, 1114) movable between a closed position in which the discharge port is not in fluid communication with the chamber, and an open position in which the discharge port is in fluid communication with the chamber, and a valve spring (318, 418, 518, 618, 718, 818, 1018, 1118) configured to bias the valve towards the closed position; and a wick (312, 412, 512, 612, 712, 812, 912, 1012, 1112, 1912) movably connected to the housing and configured to transmit an axial load to the valve to move the valve from the closed position to the open position, the wick comprising a material suitable to receive a fluid from the discharge port and pass the fluid to a location outside the housing; wherein the applicator is characterized by: means for supporting and/or increasing a stiffness of the wick (322, 422, 522, 622, 722, 824, 922, 1021, 1124, 1922, 1930).

Further illustrative aspects of the present invention may be summarized as follows:

Aspect 2. The applicator of any the foregoing Aspects, wherein the means for supporting and/or increasing the stiffness of the wick comprises a tube (322, 522, 622, 824, 922, 1922) surrounding at least a portion of the wick.

Aspect 3. The applicator of any the foregoing Aspects, wherein the tube surrounding the wick comprises one or more lateral openings (324, 530, 626, 924) extending through a wall of the tube.

Aspect 4. The applicator of any the foregoing Aspects, wherein the one or more lateral openings are positioned outside the housing.

Aspect 5. The applicator of any the foregoing Aspects, wherein the one or more lateral openings are positioned inside the housing.

Aspect 6. The applicator of any the foregoing Aspects, wherein the wick is mounted to the tube to be movable between an extended position and a retracted position, and a wick spring (526) is operatively positioned between the wick and the tube and configured to bias the wick to the extended position.

Aspect 7. The applicator of any the foregoing Aspects, wherein the wick spring has a lower spring constant than the valve spring.

Aspect 8. The applicator of any the foregoing Aspects, wherein the tube comprises a trigger (624) located outside the housing and configured to be operated to move the valve from the closed position to the open position.

Aspect 9. The applicator of any the foregoing Aspects, wherein the housing further comprises a grip surface (628) spaced from the trigger and configured to be held to hold the housing against a force applied to the trigger.

Aspect 10. The applicator of any one of the preceding Aspects, wherein the wick comprises a one of a selection of different wicks (812', 812", 812'", 812"", 812'""), the different wicks being interchangeably connectable to the tube.

Aspect 11. The applicator of any the foregoing Aspects, wherein the means for supporting and/or increasing the stiffness of the wick comprises an internal support (422, 1124) that is at least partially surrounded by the wick.

Aspect 12. The applicator of any the foregoing Aspects, wherein the wick and, preferably the internal support, are bent at a nonzero angle relative to the discharge port.

Aspect 13. The applicator of any one of the preceding Aspects, wherein the housing comprises a tip portion (1004) and a handle portion (1006), and the tip portion is movable relative to the handle portion.

Aspect 14. The applicator of any the foregoing Aspects, wherein the tip portion is attached to the handle portion by a rotating connection (1022).

Aspect 15. The applicator of any the foregoing Aspects, wherein the means for supporting and/or increasing the stiffness of the wick comprises an inner bundle of fibers forming a first portion of the wick having a stiffness greater than a second portion of the wick comprising an outer layer, preferably the outer layer comprises a cover or coating of material or fibers chemically and/or mechanically treated to reduce stiffness thereof.

According to another aspect of the invention ("Aspect 16"), an applicator for hazardous material is provided comprising: a housing (1302, 1402, 1502, 1602, 1702, 1802, 2002, 2102, 2202, 2302, 2402) having a chamber (1308, 1408, 1508, 1608, 1708, 1808, 2008, 2108, 2208, 2308, 2408); a discharge port (1310, 1410, 1510, 1610, 1710, 1810, 2010, 2110, 2210, 2310, 2410); a wick (1312, 1412, 1512, 1612, 1712, 1812, 2012, 2112, 2212, 2312, 2412) connected to the discharge port; and a valve (1314, 1414, 1514, 1630, 1730, 1830, 2014, 2114, 2214, 2330, 2428, 2430) fluidly connected to the chamber and movable between a closed position in which the valve fluidly disconnects the discharge port from the chamber, and an open position in which the valve fluidly connects the discharge port to the chamber; wherein the applicator is characterized by: means for regulating a volume of flow from the chamber to the wick.

Aspect 17. The applicator of any the foregoing Aspects, wherein the means for regulating the volume of flow comprises a flexible wall (1322, 1422) of the chamber, the flexible wall being configured to be compressed to increase the volume of flow.

Aspect 18. The applicator of any the foregoing Aspects, wherein the housing comprises a flexible bottle forming the flexible wall, or a portion of the housing comprises a flexible membrane forming the flexible wall.

Aspect 19. The applicator of any the foregoing Aspects, wherein the means for regulating the volume of flow comprises a piston (1622, 1722, 1822, 2326) slidable within and sealed against a cylinder (1624, 1708, 1808, 2328) to form a variable sized chamber (1634) in fluid communication with the wick, the piston being movable to reduce the volume of the variable sized chamber and thereby displace fluid from the variable sized chamber to the wick.

Aspect 20. The applicator of any the foregoing Aspects, wherein the piston and cylinder are located in the housing.

Aspect 21. The applicator of any the foregoing Aspects, wherein the piston and cylinder are connected to the housing by a flexible tube (2322).

Aspect 22. The applicator of any the foregoing Aspects, further comprising a spring (1618) configured to bias the piston to reduce the volume of the variable sized chamber, and wherein the piston is connected to the wick such that a force applied to the wick acts against the spring to move the piston to increase the volume of the variable sized chamber.

Aspect 23. The applicator of any the foregoing Aspects, further comprising a spring (1718, 1818, 2318) configured to bias the piston to increase the volume of the variable sized chamber, and wherein the applicator comprises a button (1738, 1838, 2336) configured to be operated by a user to move the piston to decrease the volume of the variable sized chamber.

Aspect 24. The applicator of any the foregoing Aspects, wherein the valve comprises:

a first one-way valve (1630, 1730, 1834, 2330) located in a first passage extending though the piston and configured to open when the piston moves to increase the volume of the variable sized chamber and close when the piston moves to decrease the volume of the variable sized chamber; and a second one-way valve (1630, 1730, 1834, 2330) located in a second passage extending though the piston and configured to open when the piston moves to decrease the volume of the variable sized chamber and close when the piston moves to increase the volume of the variable sized chamber.

Aspect 25. The applicator of any of the foregoing Aspects, further comprising means for adjusting a travel distance of the piston.

Aspect 26. The applicator of any the foregoing Aspects, wherein the means for regulating a volume of flow from the chamber to the wick comprises a trigger (624, 1738, 1838, 2004, 2124, 2224, 2324, 2424) configured to operate the valve, the trigger being separate from the wick.

Aspect 27. The applicator of any the foregoing Aspects, wherein the trigger comprises a proximal portion (2004) of the housing that is movable relative to a distal portion (2006) of the housing to thereby move the valve to the open position.

Aspect 28. The applicator of any the foregoing Aspects, wherein the trigger comprises a cam driver (2128, 2228) operable to move a cam (2126, 2226) connected to the valve.

Aspect 29. The applicator of any the foregoing Aspects, wherein the valve, cam driver, and cam are located on the housing.

Aspect 30. The applicator of any the foregoing Aspects, wherein the valve, cam driver, and cam are located on a flexible tube (2222) connecting the housing to the wick.

Aspect 31. The applicator of any the foregoing Aspects, wherein the trigger comprises flexible chamber (2426) and the valve comprises first one way valve (2428) located between the flexible chamber and the chamber and a second one way valve (2430) located between the flexible chamber and the wick, wherein the first one way valve is configure to close when the flexible chamber is compressed, and open when the flexible chamber expands, and the second one way valve is configured to open when the flexible chamber is compressed and close when the flexible chamber expands.

According to yet another aspect of the invention ("Aspect 32"), an applicator for hazardous material is provided comprising: a housing (1002, 1202, 2002, 2102, 2202, 2302, 2402, 2502) extending in a longitudinal direction "L" and having a chamber (1008, 1208, 2008, 2108, 2208, 2308, 2408, 2508); a discharge port (1010, 1210, 2010, 2110, 2210, 2310, 2410, 2510); a wick (1012, 1212, 2012, 2112, 2212, 2312, 2412, 2512) connected to the discharge port; and a valve (1014, 1214, 2014, 2114, 2214, 2330, 2428, 2430, 2514) fluidly connected to the chamber and movable between a closed position in which the valve fluidly disconnects the discharge port from the chamber, and an open position in which the valve fluidly connects the discharge port to the chamber; wherein the applicator is characterized by: means for positioning the wick at a nonzero angle relative to at least a portion of the housing, preferably the nonzero angle is greater than or equal to 1 degree relative to the longitudinal direction "L" of the housing.

Aspect 33. The applicator of any the foregoing Aspects, wherein the means for positioning the wick relative to at least a portion of the housing comprises a proximal portion (1004, 2504) of the housing that is movable relative to a distal portion (1006, 2506) of the housing.

Aspect 34. The applicator of any the foregoing Aspects, wherein the proximal portion of the housing is connected to the distal portion of the housing by a rotating connection (1022) or flexible section (2522).

Aspect 35. The applicator of any the foregoing Aspects, wherein the means for positioning the wick at a nonzero angle relative to at least a portion of the housing comprises a proximal portion (1204) of the housing that is fixed at the nonzero angle relative to a distal portion (1206) of the housing, the discharge port 1210 and wick 1212 are oriented along an axis A that is angled relative to the longitudinal direction L, preferably the valve 1214 and spring 1218 are also oriented along axis A.

Aspect 36. The applicator of any the foregoing Aspects, wherein the means for positioning the wick at a nonzero angle relative to at least a portion of the housing comprises a flexible tube (2022, 2122, 2222, 2322, 2422).

Aspect 37. The applicator of any the foregoing Aspects, further comprising means for regulating the volume of flow comprising a flexible wall of the chamber (1008, 1208, 2008, 2108, 2208, 2308, 2408, 2508), the flexible wall being configured to be compressed to increase the volume of flow.

Aspect 38. The applicator of any the foregoing Aspects, wherein the housing (1002, 1202, 2002, 2102, 2202, 2302, 2402, 2502) comprises a flexible bottle forming the flexible wall, or a portion of the housing comprises a flexible membrane forming the flexible wall.

Aspect 39. The applicator of any the foregoing Aspects, further comprising means for regulating the volume of flow comprising a piston (1624, 1722, 1822, 2326) slidable within and sealed against a cylinder (1624, 1708, 1808, 2328) to form a variable sized chamber (1634) in fluid communication with the wick, the piston being movable to reduce the volume of the variable sized chamber and thereby displace fluid from the variable sized chamber to the wick.

Aspect 40. The applicator of any the foregoing Aspects, wherein the piston and cylinder are located in the housing.

Aspect 41. The applicator of any the foregoing Aspects, wherein the piston and cylinder are connected to the housing by the flexible tube.

Applicants' pen-type applicators may be used in dispensing hazardous materials such as metal pretreatment products including but not limited to, conversion coating materials, including but not limited to Cr(VI), Cr(III), non-Cr conversion coating materials, as well as cleaners, adhesion promoters and other compositions for metal pretreatment, which are often reactive and/or of hazardous acid or alkaline pH, by way of non-limiting example, pH 1-5 or pH 9-14.

BRIEF DESCRIPTION OF THE DRAWINGS

Embodiments of inventions will now be described, strictly by way of example, with reference to the accompanying drawings, in which:

FIG. 7 is a schematic cutaway view of another embodiment of a pen-type applicator of the present invention.

FIG. 8 is a schematic cutaway view of another embodiment of a pen-type applicator system of the present invention.

FIGS. 21A and 21B are schematic cutaway views of another embodiment of a pen-type applicator of the present invention.

FIGS. 22A and 22B are schematic cutaway views of another embodiment of a pen-type applicator of the present invention.

DESCRIPTION OF EXEMPLARY EMBODIMENTS

Pen-type applicators for dispensing hazardous chemicals are used in operating environments that are oftentimes unique to the particular industry associated with the chemical treatment being performed. For example, in the context of performing touch-up work on aircraft parts, a pen-type applicator is often used by a technician who must safely, completely, and accurately perform the dispensing operation, while avoiding physical contact with the chemical and without errantly dispensing material to surfaces or locations other than the target treatment site. The technician also frequently uses the dispenser in a hazardous environment, such as on scaffolding or ladders at heights sufficient to address parts of aircraft or the like. The surfaces that require treatment can be at virtually any location and orientation relative to the technician, and thus the technician must be able to reach in any direction (including straight up) to apply the chemical.

Figure 1:
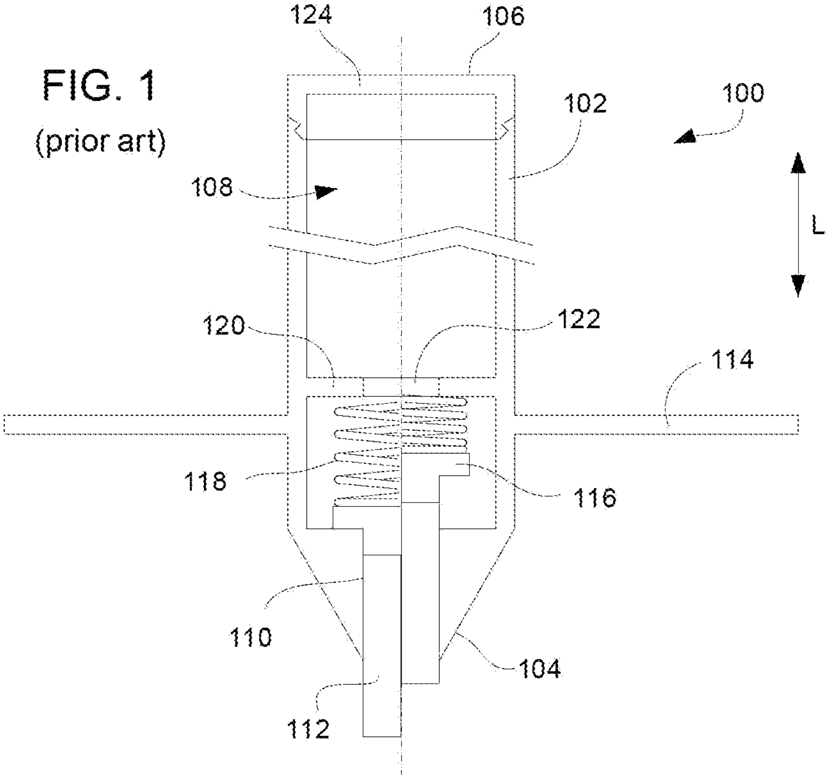
FIG. 1 (prior art)
FIG. 1 is a schematic cutaway view of a pen-type applicator of the prior art.

A conventional pen-type applicator 100 is shown in FIG. 1. The applicator 100 has a housing 102 that extends in a longitudinal direction L from a proximal end 104 to a distal end 106. The housing forms a chamber 108 that holds a flowable material. The proximal end 104 has a discharge port 110 that provides a fluid passage from the chamber 108 to the exterior environment. A wick 112 is located in, and projects from the discharge port 110. The wick 112 preferably comprises a foraminous material such as polyester or polyethylene, which will conduct the flowable material from the chamber 108 to a surface being treated. The housing 102 includes a collar 114 that extends radially from the housing 102 to form a disk-like projection. The collar 114 is sized to prevent the applicator 100 from being placed into a typical pocket on the technician's clothing.

The wick 112 is movably supported within the discharge port 110, such as by forming the parts with cooperating sliding shapes or surfaces. A valve 116 is attached to a distal end of the wick 112, and a spring 118 is provided in the housing 102 to bias the valve 116 and the wick 112 in the proximal direction. The spring 118 enables the wick 112 and valve 116 to move between a closed position such as shown on the left side of FIG. 1, and an open position such as shown on the right side of FIG. 1. In the closed position, the valve 116 contacts a corresponding wall of the chamber 108 to form a seal that prevents the flowable material from passing from the chamber 108 to the wick 112. In the opened position, the valve 116 does not seal against the wall, and flowable material is free to pass by gravity to the wick 112 and thence to the surface being treated.

Figure 2:
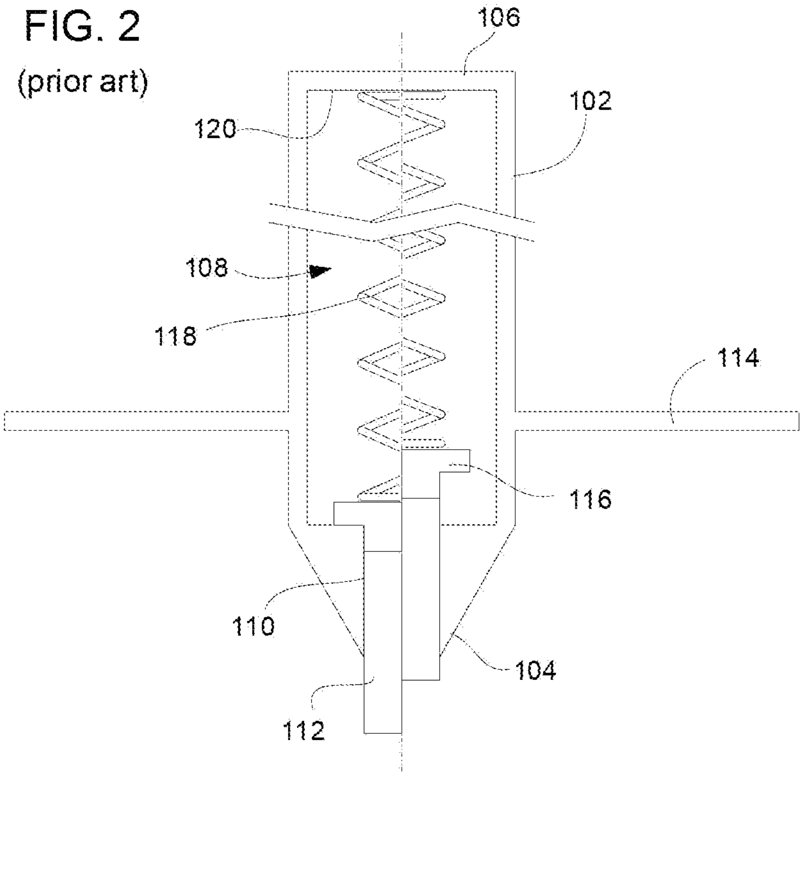
FIG. 2 (prior art)
FIG. 2 is a schematic cutaway view of another pen-type applicator of the prior art.

FIGS. 1 and 2 show two different arrangements of the chamber 108 and spring 118. In FIG. 1, the spring 118 is positioned between a distal support wall 120 and the valve 116, with the support wall 120 being located between the proximal and distal ends of the chamber 108. The support wall 120 of FIG. 1 includes one or more openings 122 to allow flowable material to move throughout the chamber 108. The construction of FIG. 1 allows the distal end of the chamber 108 to be openable, such as by a screw cap 124, to replace the flowable material without interfering with or removing the spring 118. In FIG. 2, the distal support wall 120 is formed as the distal end of the chamber 108, which is more suitable for a permanently sealed housing 102.

It has been found that conventional pen-type dispensers, such as those shown in FIGS. 1 and 2, can have certain deficiencies. For example, the size of the dispensing tip can be too large to fit into certain holes, or cannot reach fully into certain openings. The elongated pen-type configuration also can be unable to fit into relatively narrow spaces or to reach into corners. Also, the safety collar, which extends radially from the pen body to prevent placement of the device in clothing pockets, can impede access to certain surfaces. Still another drawback is the inability of the wick to conform to corners and other tight or narrow spaces, which can lead to insufficient coverage of the chemical on the surface being treated. These drawbacks have led to the need to use supplemental devices, such as cotton swabs, to fully treat the portions of the surfaces that cannot be reached by the pen applicator wick.

One potential modification to existing devices is to make the wick smaller in diameter or cross-section to be able to reach into corners and narrower spaces. It has been found, however, that making the wick smaller can lead to problems with operating the spring to open the valve. In typical use of the prior art devices, the operator simply presses the wick against a surface to dispense the material. This is simple, convenient, and can be performed with a single hand, which makes the operation safer and easier to conduct when being performed in locations where the user's other hand can be used for support. Making the wick smaller in diameter makes the wick less rigid, and less suitable to press against the closing force of the valve without bending or breaking. The same problem occurs when making the wick longer.

In one embodiment, the resistance or stiffness of the valve and spring is reduced to allow for the smaller wick's reduced strength. This solves some application challenges, but weaker springs may permit leakage of hazardous material and the body of the pen can still impede access to smaller application areas.

In another embodiment, a stiffer wick material may be used, but this can have the drawback that passage of the flowable material is impeded and can tend to clog the wick.

Figure 3:
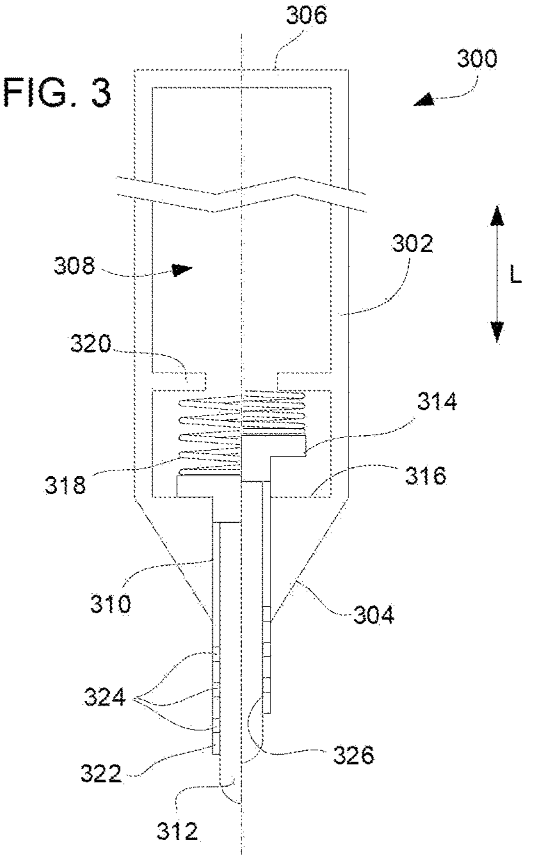
FIG. 3 is a schematic cutaway view of an embodiment of a pen-type applicator of the present invention.
Figure 4:
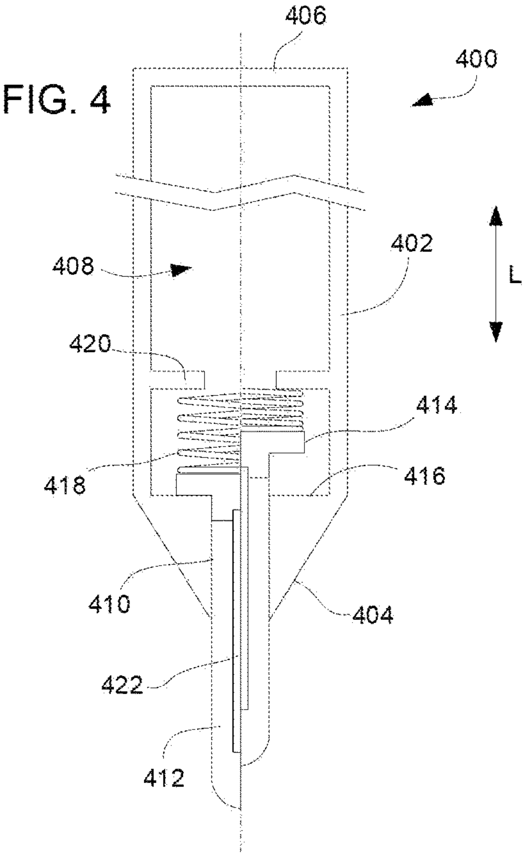
FIG. 4 is a schematic cutaway view of another embodiment of a pen-type applicator of the present invention.
Figure 5:
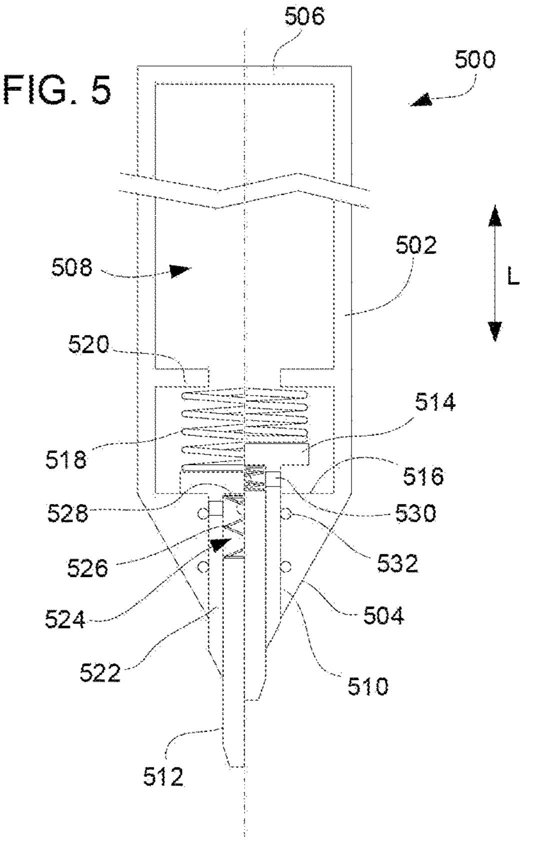
FIG. 5 is a schematic cutaway view of another embodiment of a pen-type applicator of the present invention.

Referring now to FIGS. 3 through 5, the inventors have identified various other embodiments of approaches to allowing a smaller wick diameter and/or greater wick length, without compromising the user's ability to use the wick to depress the spring.

FIG. 3 shows an example of an applicator 300 having a housing 302 that extends from a proximal end 304 to a distal end 306, with a chamber 308 for holding flowable material. A collar (not shown) or other features also may be provided on the housing 302. A discharge port 310 connects the chamber 308 to the exterior environment. A wick 312 is located in and protrudes from the discharge port 310. A valve 314 is operatively attached directly or via intervening parts to the distal end of the wick 312, to move along with the wick 312. The wick 312 is slidable within the discharge port 310 along a longitudinal direction L between an extended position (left side of FIG. 3) and a retracted position (right side of FIG. 3). When the wick 312 is in the extended position, the valve 314 abuts and seals against a corresponding first wall 316 (e.g., a wall of the chamber 308 or a surface of a valve subassembly installed in the applicator 300) to prevent the flowable material from passing from the chamber 308 to the wick 312. When the wick 312 is in the retracted position, the valve 314 unseats from the first wall 316 and allows flowable material to pass from the chamber 308 to the wick 312. A spring 318 is located between the valve 314 and a second wall 320 (e.g. a wall of the chamber 308 or a surface of a valve assembly installed in the applicator 300). The spring 318 is compressed to generate a resilient biasing force that presses on the valve 314 to bias the wick 312 to the extended position. Applying an opposite force along the wick 312 overcomes the spring bias, and moves the wick 312 to the retracted position.

The embodiment of FIG. 3 preferably has an undersized wick 312 as compared to the amount of force required to repeatedly move the wick 312 from the extended position to the retracted position. This means that the material and/or dimensions of the wick 312 are selected such that the wick 312 will, over the course of use and absent the additional provisions discussed here, tend to buckle under a retracting force applied distally to the wick 312 along longitudinal direction L, rather than moving to the retracted position with the valve opened. An undersized wick may not fail upon a first actuation, but after some use before the applicator's contents are exhausted, leading to wasted material and possible spillage of the remaining contents of the applicator 300. The selection of the wick 312 size and material to render it undersized as compared to the biasing force of the spring 318 is a matter of conventional mechanics, and can be determined mathematically or empirically without undue experimentation, and need not be described in detail herein. The lack of durability of the wick 312 to transfer the retracting force is remedied by adding an exterior support tube 322 defining a lumen 326, which surrounds the wick 312, supporting and increasing stiffness of the wick and extends in the longitudinal direction at least partially along the length of the wick 312.

The exterior support tube 322 may extend in the distal direction to contact the valve 314 and may be integrally formed with the valve 314, and may extend in the proximal direction to extend from or be flush with the discharge port 310 when the wick 312 is in the retracted position, but other configurations are possible. The support tube 322 and wick 312 collectively have sufficient strength to convey a retracting force from the wick 312 to the spring 318. Thus, applying a distally-directed retracting force to the wick 312 along the longitudinal direction L will cause the wick 312, tube 322 and valve 314 to retract, and thereby allow flowable material to pass from the chamber 308 to the wick 312. The tube 322 may comprise any suitably rigid material, such as a thermoplastic, polymer, rubber, or the like that is resistant to attack by the flowable material, and preferably is in an interference fit with the wick 312. However, it is not strictly required for the tube 322 to be more rigid than the wick 312, provided the collective rigidity of the parts is sufficient to transfer the retracting force to the spring 318. Furthermore, the wick 312 and tube 322 may be somewhat flexible in the assembled state, to allow the wick 312 to distort to treat narrow spaces and corners. The tube 322 may be installed on the wick 312 by, for example, molding it in place on the wick 312, wrapping it around the wick 312 and sealing it to itself (e.g., by ultrasonic or heat bonding or adhesive bonding), shrink-fitting it to the wick 312 (e.g., using a heat-sensitive thermoplastic that shrinks upon application of heat, drawing or press fitting the wick 312 into the tube 322 or stretching the tube 322 over a tubular mandrel and removing the mandrel when the tube 322 is surrounding the wick 312), and so on.

The proximal end of the wick 312 protrudes from the support tube 322 by a distance sufficient to provide the desired disposition characteristics for the flowable material. For example, if it is desired for the applicator 300 to be used primarily to direct the material onto the bottom of a recessed opening, the tube 322 may extend to terminate close to the proximal end of the wick 312. In contrast, if the applicator 300 is intended to be used to coat the bottom and sides of recesses with material, then there may be a larger length of wick extending between the proximal end of the wick 312 and the proximal end of the tube 322. The tube 322 also may include lateral openings 324 that communicate with the lumen 326 to provide additional outlets for flowable material to move perpendicular to the longitudinal direction L (i.e., in a lateral direction), which is expected to provide a greater degree of stiffness to the wick 312 while still allowing lateral flow to help apply material to sides of recesses. Dispensing in the lateral direction might also be enhanced by forming the wick 312 to extend outwardly from the lumen 326 of the tube 322 through the lateral openings 324. For example, the wick 312 may comprise a soft material, or a soft outer layer of material (e.g., a layer of woven or nonwoven felt-like material), that is sufficiently compliant to protrude through the lateral openings 324 when the wick 312 is disposed in the lumen 326 of the tube 322.

FIG. 4 illustrates another example of an applicator 400 having a housing 402 that extends from a proximal end 404 to a distal end 406, with a chamber 408 for holding flowable material. A collar (not shown) or other features also may be provided on the housing 402. A discharge port 410 connects the chamber 408 to the exterior environment. A wick 412 is located in and protrudes from the discharge port 410. A valve 414 is operatively attached directly or via intervening parts to the distal end of the wick 412, to move along with the wick 412. The wick 412 is slidable within the discharge port 410 along a longitudinal direction L between an extended position (left side of FIG. 4) and a retracted position (right side of FIG. 4). When the wick 412 is in the extended position, the valve 414 abuts and seals against a corresponding first wall 416 (e.g., a wall of the chamber 408 or a surface of a valve subassembly installed in the applicator 400) to prevent the flowable material from passing from the chamber 408 to the wick 412. When the wick 412 is in the retracted position, the valve 414 unseats from the first wall 416 and allows flowable material to pass from the chamber 408 to the wick 412. A spring 418 is located between the valve 414 and a second wall 420 (e.g. a wall of the chamber 408 or a surface of a valve assembly installed in the applicator 400). The spring 418 is compressed to generate a resilient biasing force that presses on the valve 414 to bias the wick 412 to the extended position. Applying an opposite force along the wick 412 overcomes the spring bias and moves the wick 412 to the retracted position.

The embodiment of FIG. 4 also preferably has an undersized wick 412 as compared to the amount of force required to move the wick 412 from the extended position to the retracted position. The inability of the wick 412 to transfer the retracting force for the service life of the applicator 400 is remedied by stiffening the wick by adding an internal support 422, which is surrounded or partially surrounded by the wick 412 and extends in the longitudinal direction at least partially along the length of the wick 412. The internal support 422 may extend in the distal direction to contact the valve 414 and may be integrally formed with the valve 414, and may extend in the proximal direction to extend from or be flush with the discharge port 410 when the wick 412 is in the retracted position, but other configurations are possible. The internal support 422 and wick 412 collectively have sufficient strength to convey a retracting force from the wick 412 to the spring 418. Thus, applying a distally-directed retracting force to the wick 412 along the longitudinal direction L will cause the wick 412, internal support 422 and valve 414 to retract, and thereby allow flowable material to pass from the chamber 408 to the wick 412.

The internal support 422 may comprise any suitably rigid material, such as a metal, thermoplastic, polymer, rubber, or the like. It is not strictly required for the internal support 422 to be more rigid than the wick 412, provided the collective rigidity of the parts is sufficient to transfer the retracting force to the spring 418. Furthermore, the wick 412 and internal support 422 may be somewhat flexible in the assembled state, to allow the wick 412 to distort to treat narrow spaces and corners. To this end, the internal support 422 might extend to terminate at or near the proximal end of the wick 412 to help force the wick material into corners. The internal support 422 may be installed in the wick 412 by, for example, molding it in place in a cavity in the wick 412, pressing into the wick material, and so on.

The internal support 422 may have any shape that helps resist buckling or nonelastic deforming loads on the wick 412. For example, the internal support 422 may comprise one or more cylindrical protrusions from the valve 414. The internal support 422 also may be hollow, with either an open space or wick material located within it. A hollow internal support 422 without wick material inside may be particularly helpful to convey a higher flow rate of the flowable material to the proximal end of the wick 412. Likewise, the internal support 422, and particularly a hollow internal support 422, may have lateral openings such as the lateral openings 324 described in relation to the embodiment of FIG. 3, to provide an additional lateral flow path for the flowable material. Other alternatives and variations will be apparent to persons of ordinary skill in the art in view of the present disclosure.

FIG. 5 illustrates another example of an applicator 500 having a housing 502 that extends from a proximal end 504 to a distal end 506, with a chamber 508 for holding flowable material. A collar (not shown) or other features also may be provided on the housing 502. A discharge port 510 connects the chamber 508 to the exterior environment. A wick 512 is located in and protrudes from the discharge port 510. A valve 514 is operatively attached directly or via intervening parts to the distal end of the wick 512, to move along with the wick 512 in a two-stage motion as described below. The wick 512 is slidable within the discharge port 510 along a longitudinal direction L between an extended position (left side of FIG. 5) and a retracted position (right side of FIG. 5). When the wick 512 is in the extended position, the valve 514 abuts and seals against a corresponding first wall 516 (e.g., a wall of the chamber 508 or a surface of a valve subassembly installed in the applicator 500) to prevent the flowable material from passing from the chamber 508 to the wick 512. When the wick 512 is in the retracted position, the valve 514 unseats from the first wall 516 and allows flowable material to pass from the chamber 508 to the wick 512. A first spring 518 is located between the valve 514 and a second wall 520 (e.g. a wall of the chamber 508 or a surface of a valve assembly installed in the applicator 500). The first spring 518 is compressed to generate a resilient biasing force that presses on the valve 514 to bias the wick 512 to the extended position. Applying an opposite force along the wick 512 overcomes the spring bias and moves the wick 512 to the retracted position.

In this case, the wick 512 is slidably retained within a support 522, and the support 522 is slidably retained in the discharge port 510. The support 522 may be cylindrical or have other shapes to accommodate the cross-sectional profiles of the wick 512 and the discharge port 510 (e.g., rectangular, square, oval, etc.). The support 522 includes a support chamber 524, in which the wick 512 is slidable along the longitudinal direction L. A second spring 526 is located in the support chamber 524 between a distal end of the wick 512 and a facing internal wall 528 of the support 522.

The embodiment of FIG. 5 preferably has an undersized wick 512 as compared to the amount of force required to move the first spring 518 to unseat the valve 514. However, the wick 512 is not undersized as compared to the amount of force required to compress the second spring 526. Thus, the second spring 526 has a lower spring constant than the first spring 518.

This embodiment provides a two stage retraction operation. A distally-directed force applied along the longitudinal direction L to the proximal end of the wick 512 first compresses the second spring 526 until the wick 512 is retracted into the support chamber 524, and then compresses the support 522 and wick 512 to the retracted position to unseat the valve 514. This embodiment overcomes the problem of having a wick 512 that is too small to convey the valve-opening force by retracting the wick 512 into a rigid (or relatively rigid) support 522, effectively increasing stiffness of the wick. The support 522 provides sufficient lateral support to transfer the retracting force and open the valve 514. The wick 512 may protrude out of the support 522 when the wick 512 is fully retracted in the support 522 (as shown in FIG. 5), or it may be pressed flush with the proximal end of the support 522. The support 522 also includes openings sufficient to allow flowable material to pass through it to the wick 512. For example, the support 522 may include lateral openings 530 that are exposed to the chamber 508 when the valve 514 is unseated. If necessary, seals, such as O-rings 532, may be provided between the support 522 and the discharge port 510 to prevent leaking of flowable material therethrough.

Figure 6:
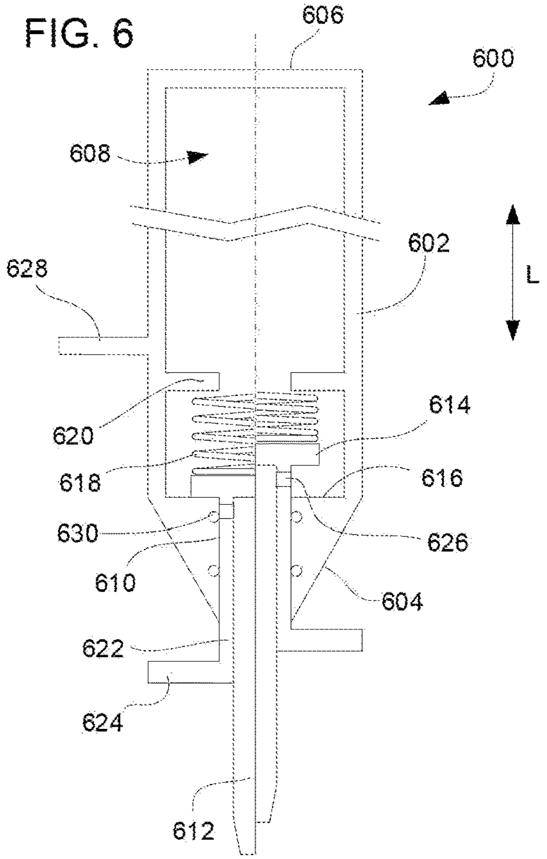
FIG. 6 is a schematic cutaway view of another embodiment of a pen-type applicator of the present invention.

Referring now to FIG. 6, other embodiments may include features that permit the use of an undersized wick, but without requiring the wick to be supported or reinforced to convey the necessary force to unseat the valve. In FIG. 6, the applicator 600 has a housing 602 that extends from a proximal end 604 to a distal end 606, with a chamber 608 for holding flowable material. A collar (not shown) or other features also may be provided on the housing 602. A discharge port 610 connects the chamber 608 to the exterior environment. A wick 612 is located in and protrudes from the discharge port 610. A valve 614 is operatively attached directly or via intervening parts to the distal end of the wick 612, to move along with the wick 612. The wick 612 is slidable within the discharge port 610 along a longitudinal direction L between an extended position (left side of FIG. 6) and a retracted position (right side of FIG. 6). When the wick 612 is in the extended position, the valve 614 abuts and seals against a corresponding first wall 616 (e.g., a wall of the chamber 608 or a surface of a valve subassembly installed in the applicator 600) to prevent the flowable material from passing from the chamber 608 to the wick 612. When the wick 612 is in the retracted position, the valve 614 unseats from the first wall 616 and allows flowable material to pass from the chamber 608 to the wick 612. A spring 618 is located between the valve 614 and a second wall 620 (e.g. a wall of the chamber 608 or a surface of a valve assembly installed in the applicator 600). The spring 618 is compressed to generate a resilient biasing force that presses on the valve 614 to bias the wick 612 to the extended position.

The embodiment of FIG. 6 preferably has an undersized wick 612 as compared to the amount of force required to move the first spring 618 to unseat the valve 614. However, the wick 612 is immobilized within a support 622, and the support 622 is slidably retained in the discharge port 610. The support 622 may be cylindrical or have other shapes to accommodate the cross-sectional profiles of the wick 612 and the discharge port 610 (e.g., rectangular, square, oval, etc.). The support 622 is operatively connected to the valve 614, such that a retraction force can be applied to the support 622 (in addition to or instead of the wick 612) to unseat the valve 614. To this end, the support 622 may include a trigger 624 located outside the housing 602 to help an operator apply the retraction force. The support 622 also may include one or more openings 626 to allow flowable material to pass from the chamber 608 to the wick 612 when the valve 614 is unseated.

The shape and size of the trigger 624 may be selected based on the expected needs of the operator. For example, the trigger 624 may comprise an annular plate that surrounds the wick 612 (such as shown), or other shapes that allow the operator to press on the trigger using a finger, or by pushing the entire assembly against a fixed surface (e.g., placing the trigger 624 against a rigid part of the surface being treated, and pushing the applicator 600 forward). The trigger 624 also may be provided with an opposing grip surface 628 (e.g. a ring suitable to receive the operator's thumb or a plate to receive the palm) to allow the operator to squeeze the trigger 624 towards the grip surface 628 to perform one-handed opening of the valve 614. Or more seals, such as O-rings 630 or gland seals, may be provided between the support 622 and the discharge port 610 to reduce the likelihood of leaking therethrough.

The embodiment of FIG. 6 allows the use of a smaller wick while still providing convenient and safe operation of the valve at the user's discretion. A variation on the embodiment of FIG. 6 is to slidingly mount the wick 612 in a chamber within the support, with a second spring having a low spring constant biasing the wick 612 to the extended position. This modification may provide the additional functionality of the embodiment of FIG. 5. Other embodiments may combine the trigger feature of FIG. 6 with wick-supporting features in FIGS. 3 and 4. Other alternatives and variations will be apparent to persons of ordinary skill in the art in view of the present disclosure.

Another problem with existing pen-type applicators is the inability to conform the applicator felt into narrow spaces and corners. This can be particularly problematic in recessed holes, holes with unusual shapes, and where the original coating has been damaged by deep scratches. This problem has also been found when applying the coating around rivets and other fasteners, which have small openings and narrow gaps at the junction between the fastener and the underlying surface. FIGS. 7 and 8 show embodiments that are adapted to address such circumstances.

FIG. 7 shows an applicator 700 having a housing 702 that extends from a proximal end 704 to a distal end 706, with a chamber 708 for holding flowable material. A collar (not shown) or other features also may be provided on the housing 702. A discharge port 710 connects the chamber 708 to the exterior environment. A wick 712 is located in and protrudes from the discharge port 710. A valve 714 is operatively attached directly or via intervening parts to the distal end of the wick 712, to move along with the wick 712. The wick 712 is slidable within the discharge port 710 along a longitudinal direction L between an extended position (left side of FIG. 7) and a retracted position (right side of FIG. 7). When the wick 712 is in the extended position, the valve 714 abuts and seals against a corresponding first wall 716 (e.g., a wall of the chamber 708 or a surface of a valve subassembly installed in the applicator 700) to prevent the flowable material from passing from the chamber 708 to the wick 712. When the wick 712 is in the retracted position, the valve 714 unseats from the first wall 716 and allows flowable material to pass from the chamber 708 to the wick 712. A spring 718 is located between the valve 714 and a second wall 720 (e.g. a wall of the chamber 708 or a surface of a valve assembly installed in the applicator 700). The spring 718 is compressed to generate a resilient biasing force that presses on the valve 714 to bias the wick 712 to the extended position.

The wick 712 may or may not be undersized as compared to the force necessary to press the spring 718 to move the valve 714 to the retracted position. If the wick 712 is undersized, other features such as discussed above may be incorporated to accommodate or assist with operation of the valve 714.

The wick 712 includes a central support portion 722 that extends into the discharge port 710, and a pliable outer layer 724 that surrounds or is attached to the central portion 722. The outer layer 724 is more flexible than the central support portion 722, which may be made up of natural or synthetic fibers, optionally bonded, preferably polyester, polyurethane, acrylic, nylon and combinations thereof. For example, the central portion 722 may comprise a relatively stiff bundle of polyester fibers that are joined to form a cylindrical shape, and the outer layer 724 may comprise a separate cover or coating formed of a synthetic and/or natural sourced, soft, porous and/or fibrous material, e.g. felt, sponge, wool, cotton and the like. Such a cover may be removable or permanently attached to the rest of the wick 712. As another example, the wick 712 may comprise a bundle of stiff fibers, with the inner fibers being collected into a rigid central support portion 722, and the outer fibers being chemically or mechanically treated (e.g., roughened or chopped) to render them into a softer outer layer 724. Alternatively, a tube or hollow internal support, such as disclosed herein, may replace the central support portion 722 to support and stiffen wick 712, in which case an opening at the proximal end of the tube and/or lateral openings along the length of the tube or support may supply the flowable material to the soft outer layer 724 of wick 712.

The relatively soft outer layer 724 may conform to surface irregularities to improve the applicator's ability to treat crevices and corners by providing extended reach into such places. The softer outer layer 724 also can help distribute the flowable material in the lateral direction, which can help coat inner walls of narrow holes. Such lateral application can be enhanced by making the diameter $D_1$ of the softer outer layer 724 greater than the diameter $D_2$ of the adjacent portion of the central support portion 722 and greater than the diameter $D_3$ of the adjacent portion of the housing 702. This allows the proximal end of the wick 712 to be extended into narrow holes, while the pliable outer layer 724 applies the flowable material to the side surfaces of the hole.

FIG. 8 illustrates another embodiment of an applicator 800 adapted to apply flowable material to small or oddly-shaped areas. In this case, the applicator 800 has a housing 802 that extends from a proximal end 804 to a distal end 806, with a chamber 808 for holding flowable material. A collar (not shown) or other features also may be provided on the housing 802. A discharge port 810 connects the chamber 808 to the exterior environment. One of a number of wicks 812 can be attached to protrude from the discharge port 810. A valve 814 is operatively attached directly or via intervening parts to the distal end of the installed wick 812, to move along with the wick 812. The installed wick 812 is slidable within the discharge port 810 along a longitudinal direction L between an extended position and a retracted position. When the installed wick 812 is in the extended position, the valve 814 abuts and seals against a corresponding first wall 816 (e.g., a wall of the chamber 808 or a surface of a valve subassembly installed in the applicator 800) to prevent the flowable material from passing from the chamber 808 to the installed wick 812. When the installed wick 812 is in the retracted position, the valve 814 unseats from the first wall 816 and allows flowable material to pass from the chamber 808 to the wick 812. A spring 818 is located between the valve 814 and a second wall 820 (e.g. a wall of the chamber 808 or a surface of a valve assembly installed in the applicator 800). The spring 818 is compressed to generate a resilient biasing force that presses on the valve 814 to bias the installed wick 812 to the extended position.

The wick 812 may or may not be undersized as compared to the force necessary to press the spring 818 to move the valve 814 to the retracted position. If the wick 812 is undersized, other features such as discussed above may be incorporated to accommodate allow operation of the valve 814.

In the embodiment of FIG. 8, a collection of different wicks 812 is available to be selectively installed in the discharge port 810. Each wick 812 may have a unique shape designed to treat particular surfaces. For example, the wicks 812 may include a chisel-point wick 812' having a tapered proximal end, a wick 812" having a spherical proximal end, a wick 812'" having a reverse-tapered proximal end, a wick 812"" having an enlarged cylindrical end, and a wick 812'"" having a beveled or "chisel" tip. Other alternatives and variations will be apparent to persons of ordinary skill in the art in view of the present disclosure, and it will also be appreciated that these embodiments of alternative wick shapes may be used in other embodiments.

The wicks 812 have respective shafts 822 that are configured to releasably secure in a supporting carrier 824 that is slidably mounted in the discharge port 810. Seals, such as O-rings (not shown) may be provided between the carrier 824 and the discharge port 810. The carrier 824 is slidable relative to the housing 802 along the longitudinal direction L, and is operatively connected to the valve 814. The wicks 812 and carrier 824 may be held together by a friction fit, or by mechanisms such as detents or bayonet fittings. The carrier 824 includes one or more openings, such as the openings described in relation to the embodiment of FIG. 5, to allow flowable material to pass from the chamber 802 to the wick 812 when the valve 814 is unseated.

In use, the user selects the desired wick 812, inserts it into the carrier 824 disposed in discharge port 810, and uses the applicator 800 as usual, but with a customized ability to treat surfaces that would otherwise be difficult to reach using wicks 812 stiffened by supporting carrier 824 which distributes force exerted on the tip actuating the valve 814.

It will be appreciated that the foregoing embodiments may be used in conjunction with other embodiments described herein. As one non-limiting example, embodiments having a pliable outer layer 724, or replaceable wicks 812, may be used with features such as the metering valve systems in FIGS. 16 and 17.

Another persistent problem with conventional pen-type applicator bodies is that they are sized for easy handling by a user wearing protective gear and to contain sufficient quantities of flowable material, but consequently are unable to be oriented to fit into narrow spaces. In particular, the pen-type applicator can be too long to fit into narrow gaps, and the collar 114 can be too large to allow the applicator to be tilted at a low angle to reach below protrusions or the like. FIGS. 9 through 12 illustrate various alternative applicators that are intended to provide greater maneuverability to treat surfaces in confined spaces.

Figure 9:
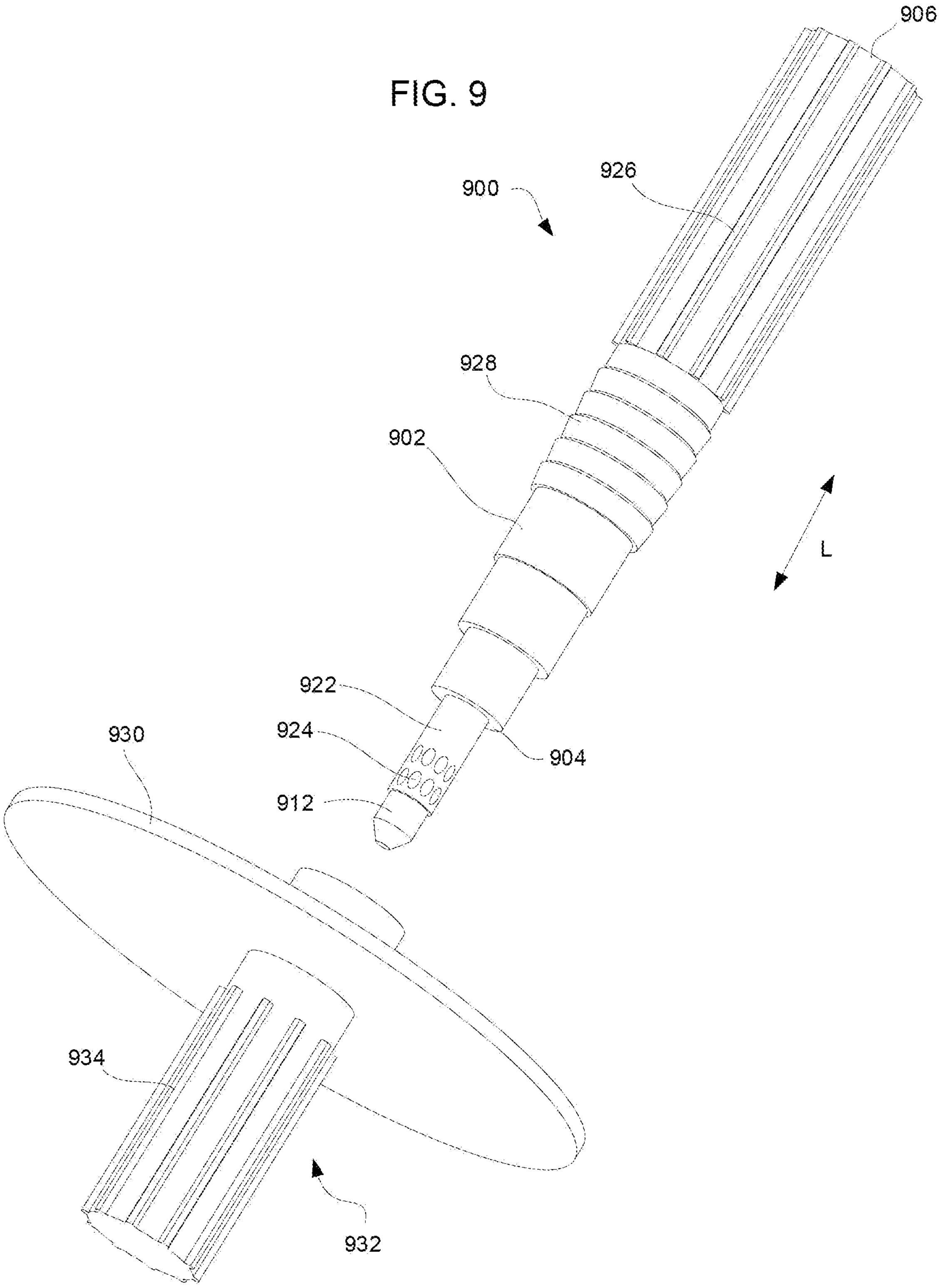
FIG. 9 is a perspective view of another embodiment of a pen-type applicator of the present invention.

FIG. 9 illustrates an applicator 900 having a housing 902 that extends from a proximal end 904 to a distal end 906, and a wick 912 extending from the proximal end 904. The applicator 900 also includes other features such as a chamber to hold the flowable material, a valve, and so on. In one embodiment, the wick 912 is disposed within the lumen of a support tube 922, which is perforated by holes 924 that extend in the lateral direction, such as described above in relation to the embodiment of FIG. 3. However, other wicks, including as a non-limiting example those other wicks described herein, may be used in other embodiments.

The housing 902 has an elongated and generally cylindrical shape, and includes features, such as ribs, knurling and the like, to allow a user with a gloved hand to operate the applicator 900. The described housing features may be included in other embodiments disclosed herein. Specifically, the housing 902 includes a plurality of longitudinal ribs 926 and a plurality of circumferential ribs 928. The longitudinal ribs 926 protrude from the adjacent outer surface of the housing 902, and extend along the longitudinal direction L (i.e., along a direction from the proximal housing end 904 to the distal housing end 906). The longitudinal ribs 926 provide enhanced grip and control to rotate the housing 902 about the longitudinal direction L. The circumferential ribs 928 extend radially from longitudinal axis to surround the circumferential perimeter of the housing 902. The circumferential ribs 928 provide grip and control to move the housing 902 along the longitudinal direction L. Some or all of the circumferential ribs 928 also may have a proximal face that is sloped outwardly in the distal direction, to provide a "sawtooth" arrangement to help enhance grip when pushing in the proximal direction. Collectively, the longitudinal ribs 926 and circumferential ribs 928 are expected to provide enhanced grip and control of the applicator 900, particularly if the applicator 900 is made smaller than an existing conventional device and/or is being maneuvered to ensure adequate contact between an awkwardly located surface and the wick 912. Although the embodiment of FIG. 9 has both longitudinal ribs 926 and circumferential ribs 928, other embodiments may have only one type of rib, or neither.

FIG. 9 also illustrates and alternative disposition for a collar 930. Specifically, the collar 930 is located on a cap 932 that is selectively secured to the housing 902 to cover and protect the wick 912. The cap 932 also may have ribs (e.g., longitudinal ribs 934) to help a gloved user install and remove the cap 932. The above-described cap and collar features shown in FIG. 9 may be included in other embodiments disclosed herein.

Figure 10A:
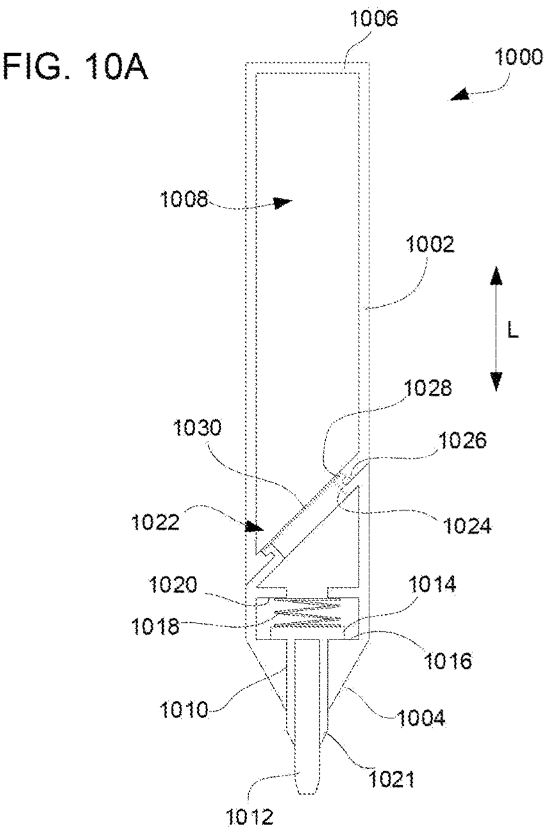
FIGS. 10A and 10B are schematic cutaway views of another embodiment of a pen-type applicator of the present invention.
Figure 10B:
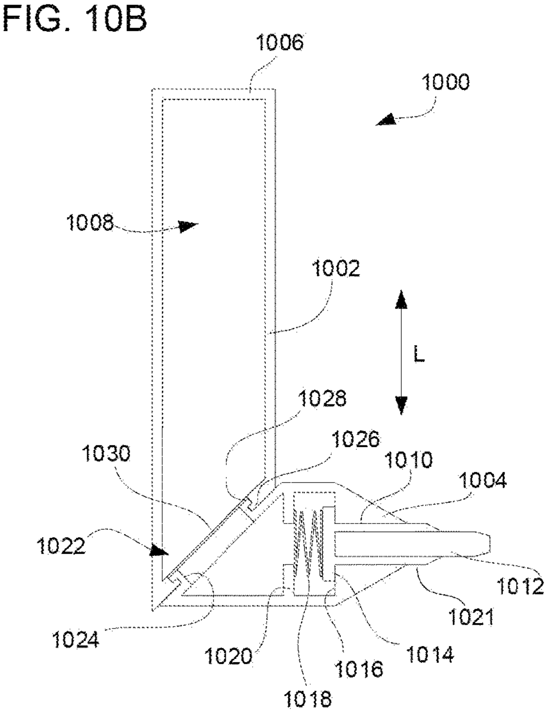

FIGS. 10A and 10B show another embodiment of an applicator 1000 that is configured for use in confined spaces. In this case, the applicator 1000 has a housing 1002 having a tip portion 1004 defining the proximal end, and a handle portion 1006 defining the distal end. One or both portions 1004, 1006 have a chamber 1008 for holding a flowable material. A collar (not shown) or other features also may be provided on the housing 1002. A discharge port 1010 connects the chamber 1008 to the exterior environment. Similar to the embodiment of FIG. 6, a wick 1012 is located within a support 1021, and the support 1021 is slidably retained in the discharge port 1010 and protrudes from the discharge port 1010. A valve 1014 is operatively attached directly or via intervening parts to the distal end of the support 1021, to move along with the wick 1012. The support 1021 holding wick 1012 is slidable within the discharge port 1010 along a longitudinal direction L between an extended position and a retracted position. When the wick 1012 is in the extended position, the valve 1014 abuts and seals against a corresponding first wall 1016 (e.g., a wall of the chamber 1008 or a surface of a valve subassembly installed in the applicator 1000) to prevent the flowable material from passing from the chamber 1008 to the wick 1012. When the wick 1012 is in the retracted position, the valve 1014 unseats from the first wall 1016 and allows flowable material to pass from the chamber 1008 to the wick 1012. A spring 1018 is located between the valve 1014 and a second wall 1020 (e.g. a wall of the chamber 1008 or a surface of a valve assembly installed in the applicator 1000). The spring 1018 is compressed to generate a resilient biasing force that presses on the valve 1014 to bias the wick 1012 to the extended position.

The housing 1002 is movable between a first configuration such as shown in FIG. 10A, and a second configuration such as shown in FIG. 10B. In particular, the tip portion 1004 is joined to the handle portion 1006 by an articulated joint, such as a rotating connection 1022. The rotating connection 1022 may comprise any movable joint, such as a pivot joint or a swivel joint. In the shown example, the rotating connection 1022 comprises a swivel joint formed by a cylindrical boss 1024 extending from the tip portion 1004, and a cylindrical receptacle 1026 in the handle portion 1006. The boss 1024 fits into the receptacle 1026 and provides relative rotation between the tip portion 1004 and the handle portion 1006. The boss 1024 includes a lip 1028 or a fastener (e.g., a spring clip, D-ring or the like) that retains the parts together. In this example, the chamber 1008 is formed in both the tip portion 1004 and the handle portion 1006, and the rotating connection 1022 has an opening 1030 also provides fluid communication between the tip portion 1004 and the handle portion 1006. One or more rotary seals (not shown) may be provided to prevent leaking through the rotating connection 1022.

During use, the operator can rotate the tip portion 1004 relative to the handle portion 1006 to orient the wick 1012 at different angles. This can help reach into confined spaces, and also provides a different hand position for using the applicator 1000 in general use. To simplify the construction, the spring 1018 and valve 1014 preferably are located in the tip portion 1004, but this is not strictly required.

Figure 11:
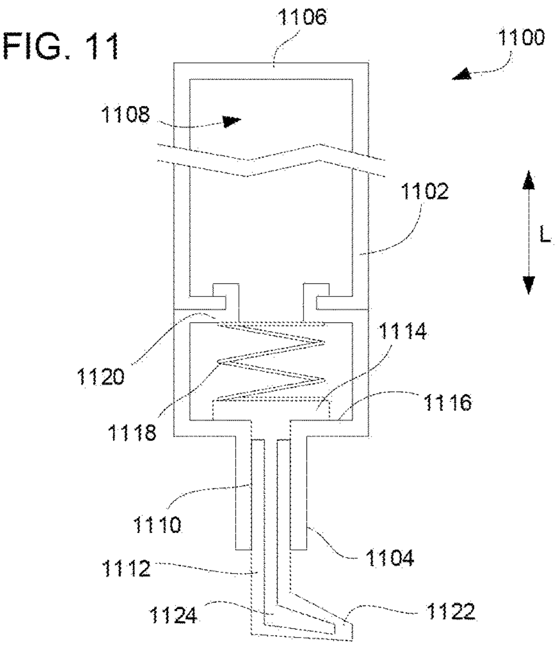
FIG. 11 is a schematic cutaway view of another embodiment of a pen-type applicator of the present invention.

FIG. 11 shows another embodiment of an applicator 1100 that is configured for use in confined spaces. The applicator 1100 has a housing 1102 that extends from a proximal end 1104 to a distal end 1106, and a chamber 1108 for holding a flowable material. A collar (not shown) or other features also may be provided on the housing 1102. A discharge port 1110 connects the chamber 1108 to the exterior environment. A wick 1112 is located in and protrudes from the discharge port 1110. A valve 1114 is operatively attached directly or via intervening parts to the distal end of the wick 1112, to move along with the wick 1112. The wick 1112 is slidable within the discharge port 1110 along a longitudinal direction L between an extended position and a retracted position. When the wick 1112 is in the extended position, the valve 1114 abuts and seals against a corresponding first wall 1116 (e.g., a wall of the chamber 1108 or a surface of a valve subassembly installed in the applicator 1100) to prevent the flowable material from passing from the chamber 1108 to the wick 1112. When the wick 1112 is in the retracted position, the valve 1114 unseats from the first wall 1116 and allows flowable material to pass from the chamber 1108 to the wick 1112. A spring 1118 is located between the valve 1114 and a second wall 1120 (e.g. a wall of the chamber 1108 or a surface of a valve assembly installed in the applicator 1100). The spring 1118 is compressed to generate a resilient biasing force that presses on the valve 1114 to bias the wick 1112 to the extended position.

The wick 1112 in this embodiment is configured with a bent shape to reach laterally into confined spaces, under overhangs, and into corners. For example, the wick 1112 may comprise a bundle of foraminous fibers that have been heated and bent to have a permanent laterally-extending L-shaped foot 1122. The foot 1122 may be supported by an internal (or external) support 1124, such as a plastic rod that extends along the wick 1112. The support helps the foot 1122 portion of the wick 1112 maintain its shape, and may be useful to drive the foot portion 1122 laterally deeper into narrow spaces, and to press the bottom of the foot portion 1122 down to treat the bottoms of holes. While the L-shaped foot is desired in this embodiment, other embodiments may use wicks with other shapes. For example, the proximal end of the wick 1112 may be configured as a J-shaped hook (which may be particularly useful for reaching under flanges or rolled metal edges such as an open hem) or have other shapes. Furthermore, the support 1124 may be omitted in other embodiments.

Figure 12:
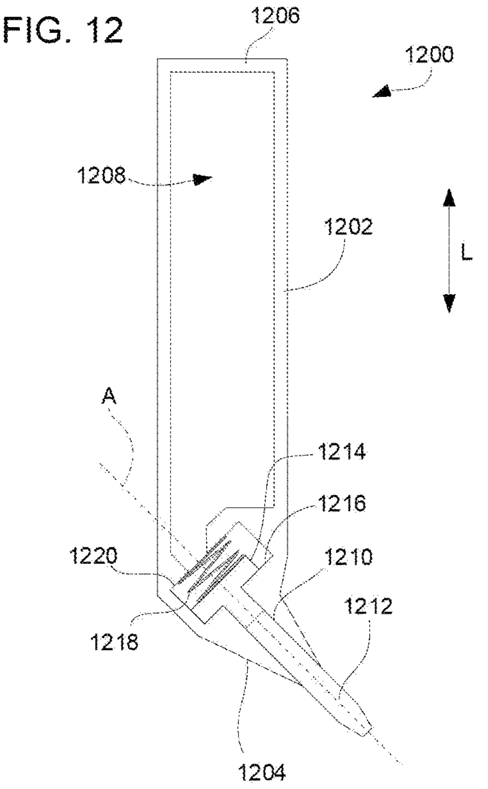
FIG. 12 is a schematic cutaway view of another embodiment of a pen-type applicator of the present invention.

FIG. 12 shows another embodiment of an applicator 1200 that is configured for use in confined spaces. The applicator 1200 has a housing 1202 that extends from a proximal end 1204 to a distal end 1206, and a chamber 1208 for holding a flowable material. A collar (not shown) or other features also may be provided on the housing 1202. A discharge port 1210 connects the chamber 1208 to the exterior environment. A wick 1212 is located in and protrudes from the discharge port 1210. A valve 1214 is operatively attached directly or via intervening parts to the distal end of the wick 1212, to move along with the wick 1212. The wick 1212 is slidable within the discharge port 1210 between an extended position and a retracted position. When the wick 1212 is in the extended position, the valve 1214 abuts and seals against a corresponding first wall 1216 (e.g., a wall of the chamber 1208 or a surface of a valve subassembly installed in the applicator 1200) to prevent the flowable material from passing from the chamber 1208 to the wick 1212. When the wick 1212 is in the retracted position, the valve 1214 unseats from the first wall 1216 and allows flowable material to pass from the chamber 1208 to the wick 1212. A spring 1218 is located between the valve 1214 and a second wall 1220 (e.g. a wall of the chamber 1208 or a surface of a valve assembly installed in the applicator 1200). The spring 1218 is compressed to generate a resilient biasing force that presses on the valve 1214 to bias the wick 1212 to the extended position.

In this example, the discharge port 1210 and wick 1212 are oriented along an axis A that is angled relative to the longitudinal direction L. For simplicity, the valve 1214 and spring 1218 are also oriented along axis A, but this is not required in all embodiments. The axis A may be oriented at any desirable angle relative to the longitudinal axis L, with 45° being expected to be a generally convenient angle for most applications. In other cases, the angle may be less than or greater than 45°. Angles equaling or exceeding 90° may be desirable for use in treating the back sides of articles, and it is envisioned that the wick 1212 could be oriented at an angle as great as 180° relative to the remainder of the applicator 1200. Other alternatives and variations will be apparent to persons of ordinary skill in the art in view of the present disclosure.

Another drawback of conventional pen-type applicators is that it can be difficult to control the flow of flowable material from the chamber to the wick. A conventional system such as illustrated in FIGS. 1 and 2 allows the operator to open and close the valve, but there is no mechanism for compelling the flowable medium to flow into the wick other than by gravity such as tilting or shaking the applicator. This is particularly problematic where surfaces to be coated are located above the wick. Another problem related to flow control is that conventional applicators are not able to meter an exact amount of flowable medium, and when the valve is opened the flowable medium can continue flowing even after the wick is saturated, which can result in drips, pooling and waste. FIGS. 13 through 17 show embodiments of applicators that address one or more of these drawbacks.

Figure 13:
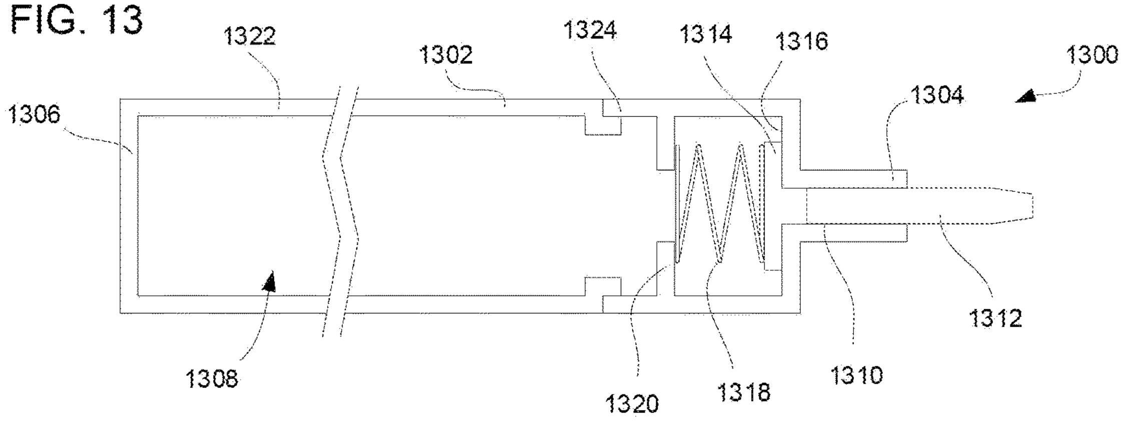
FIG. 13 is a schematic cutaway view of another embodiment of a pen-type applicator of the present invention.

FIG. 13 shows an embodiment of an applicator 1300 that is configured to allow an operator to force the disposition of fluid medium from the chamber to the wick when the valve is open. The applicator 1300 has a housing 1302 that extends from a proximal end 1304 to a distal end 1306, and a chamber 1308 for holding a flowable material. A collar (not shown) or other features also may be provided on the housing 1302. A discharge port 1310 connects the chamber 1308 to the exterior environment. A wick 1312 is located in and protrudes from the discharge port 1310. A valve 1314 is operatively attached directly or via intervening parts to the distal end of the wick 1312, to move along with the wick 1312. The wick 1312 is slidable within the discharge port 1310 between an extended position and a retracted position. When the wick 1312 is in the extended position, the valve 1314 abuts and seals against a corresponding first wall 1316 (e.g., a wall of the chamber 1308 or a surface of a valve subassembly installed in the applicator 1300) to prevent the flowable material from passing from the chamber 1308 to the wick 1312. When the wick 1312 is in the retracted position, the valve 1314 unseats from the first wall 1316 and allows flowable material to pass from the chamber 1308 to the wick 1312. A spring 1318 is located between the valve 1314 and a second wall 1320 (e.g. a wall of the chamber 1308 or a surface of a valve assembly installed in the applicator 1300). The spring 1318 is compressed to generate a resilient biasing force that presses on the valve 1314 to bias the wick 1312 to the extended position.

In this example, a portion of the housing 1302 and the chamber 1308 comprises a flexible walled portion, which is shown in FIG. 13 as being formed by a flexible bottle 1322, but can take other forms. Referring to FIG. 13, the flexible bottle 1322 can be squeezed to generate internal pressure to force the flowable material towards the wick 1312 which provides the benefit of faster wick saturation upon opening the valve 1314. For example, the flexible bottle 1322 may be made of a pliable plastic material. The flexible bottle 1322 also may be transparent to view the contents of the chamber 1308. The flexible bottle 1322 may be permanently or removably attached to the rest of the housing 1302. In this example, a proximal end of the bottle 1322 is threaded into a collar 1324 located on a rigid portion of the housing 1302, and can be removed to refill the bottle 1322. In other embodiments, the flexible bottle 1322 may be secured to the rest of the housing 1302 by a permanent connection.

The flexible bottle 1322 and the rest of the housing 1302 are aligned along the longitudinal direction L, but this is not strictly required. In other examples, the flexible bottle 1322 may be threaded into or otherwise attached to protrude laterally from or at an angle relative to the rest of the housing 1302. The flexible bottle 1322 also may be partially surrounded by the housing 1302, with a portion of the bottle 1322 exposed to allow the user to flex the bottle wall to force the flowable material towards the wick. The flexible bottle 1322 also may be fully encased in the housing 1302, and squeezed by the application of force by an intermediate part, such as a plunger located on the end of side of the housing 1302. Although shown as having a cylindrical shape, the flexible bottle 1322 may have alternative shapes.

The shown flexible bottle 1322 is intended to return to its original shape after the application of a distorting force, so as to act as a handle that can be gripped by the user. But in another alternative, the flexible bottle 1322 may comprise a bag-like structure (e.g., a bladder) that is collapsed during use. Other alternatives and variations will be apparent to persons of ordinary skill in the art in view of the present disclosure.

Figure 14:
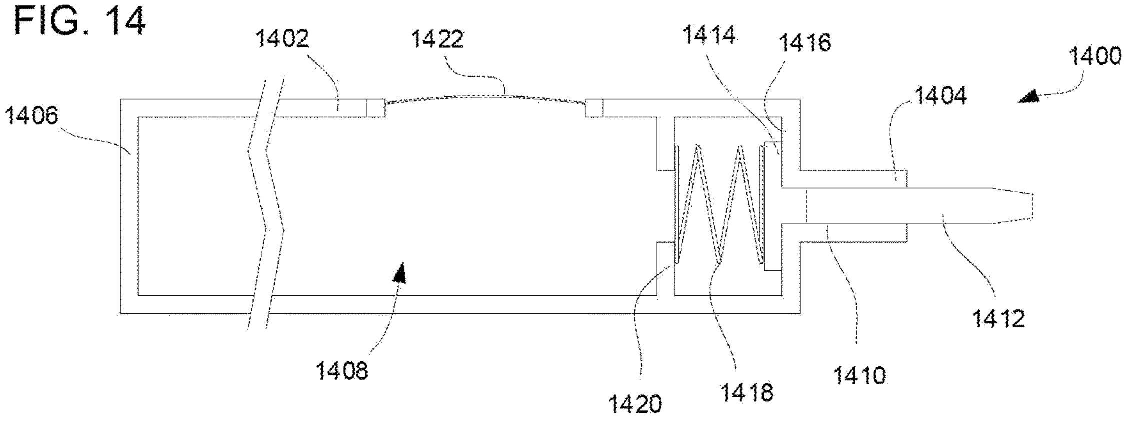
FIG. 14 is a schematic cutaway view of another embodiment of a pen-type applicator of the present invention.

FIG. 14 shows an embodiment of an applicator 1400 that is configured to allow an operator to force the disposition of fluid medium from the chamber to the wick. The applicator 1400 has a housing 1402 that extends from a proximal end 1404 to a distal end 1406, and a chamber 1408 for holding a flowable material. A collar (not shown) or other features also may be provided on the housing 1402. A discharge port

1410 connects the chamber 1408 to the exterior environment. A wick 1412 is located in and protrudes from the discharge port 1410. A valve 1414 is operatively attached directly or via intervening parts to the distal end of the wick 1412, to move along with the wick 1412. The wick 1412 is slidable within the discharge port 1410 between an extended position and a retracted position. When the wick 1412 is in the extended position, the valve 1414 abuts and seals against a corresponding first wall 1416 (e.g., a wall of the chamber 1408 or a surface of a valve subassembly installed in the applicator 1400) to prevent the flowable material from passing from the chamber 1408 to the wick 1412. When the wick 1412 is in the retracted position, the valve 1414 unseats from the first wall 1416 and allows flowable material to pass from the chamber 1408 to the wick 1412. A spring 1418 is located between the valve 1414 and a second wall 1420 (e.g. a wall of the chamber 1408 or a surface of a valve assembly installed in the applicator 1400). The spring 1418 is compressed to generate a resilient biasing force that presses on the valve 1414 to bias the wick 1412 to the extended position.

In this example, a portion of the chamber 1408 is formed as a flexible membrane 1422 that is accessible to the user. The user can depress the flexible membrane 1422 to generate internal pressure in the chamber 1408 to force the flowable material towards the wick 1412 when the valve 1414 is open. Alternatively, the wick-operated valve 1414 may be omitted, and replaced with a valve, such as the one described in relation to FIG. 24, that opens automatically upon application of sufficient pressure to the flexible membrane 1422 to move the flowable material from the chamber 1402 to the wick 1412.

The flexible membrane 1422 may comprise any suitable flexible material, and it may be transparent to allow viewing into the chamber 1408. The flexible membrane 1422 also may be located under a movable cover to prevent inadvertent operation. The flexible membrane 1422 also may be located inside the housing 1402, and operated by an intermediate device, such as a pushbutton or plunger that passes through the wall of the housing 1402. Other alternatives and variations will be apparent to persons of ordinary skill in the art in view of the present disclosure.

Figure 15:
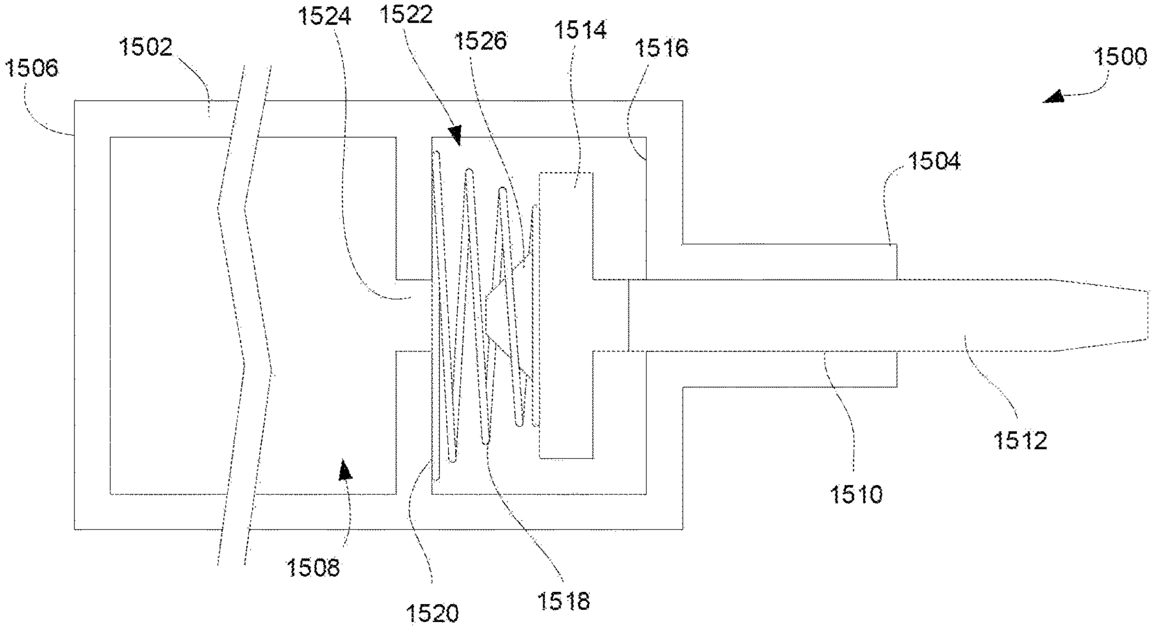
FIG. 15 is a schematic cutaway view of another embodiment of a pen-type applicator of the present invention.

FIG. 15 shows an embodiment of an applicator 1500 that is configured to prevent excessive depositing of flowable material when the wick is moved to the fully retracted position. The applicator 1500 has a housing 1502 that extends from a proximal end 1504 to a distal end 1506, and a chamber 1508 for holding a flowable material. A collar (not shown) or other features also may be provided on the housing 1502. A discharge port 1510 connects the chamber 1508 to the exterior environment. A wick 1512 is located in and protrudes from the discharge port 1510. A valve 1514 is operatively attached directly or via intervening parts to the distal end of the wick 1512, to move along with the wick 1512. The wick 1512 is slidable within the discharge port 1510 between an extended position and a retracted position. When the wick 1512 is in the extended position, the valve 1514 abuts and seals against a corresponding first wall 1516 (e.g., a wall of the chamber 1508 or a surface of a valve subassembly installed in the applicator 1500) to prevent the flowable material from passing from the chamber 1508 to the wick 1512. When the wick 1512 is in the retracted position, the valve 1514 unseats from the first wall 1516 and allows flowable material to pass from the chamber 1508 to the wick 1512. A spring 1518 is located between the valve 1514 and a second wall 1520 (e.g. a wall of the chamber 1508 or a surface of a valve assembly installed in the applicator 1500). The spring 1518 is compressed to generate a resilient biasing force that presses on the valve 1514 to bias the wick 1512 to the extended position.

In this example, the valve 1514 is located in a subchamber 1522 located between the main volume of the chamber 1508 and the wick 1512. The subchamber 1522 is fluidly connected to the main volume of the chamber 1508 by a passage 1524, and the spring 1518 may be located in the subchamber 1522, such as shown, or it may extend through the opening 1524. The valve 1514 has a secondary seal 1526 that abuts and closes the passage 1524 when the wick 1512 and valve 1514 are moved to the fully retracted position. Any type of sealing surface may be used (e.g., face seals, tapered seals (shown), a metering needle, and so on). This configuration prevents flowable material from continuing to pass to the wick when the wick is fully retracted, and provides some measure of protection against overdispensing the material.

Figure 16:
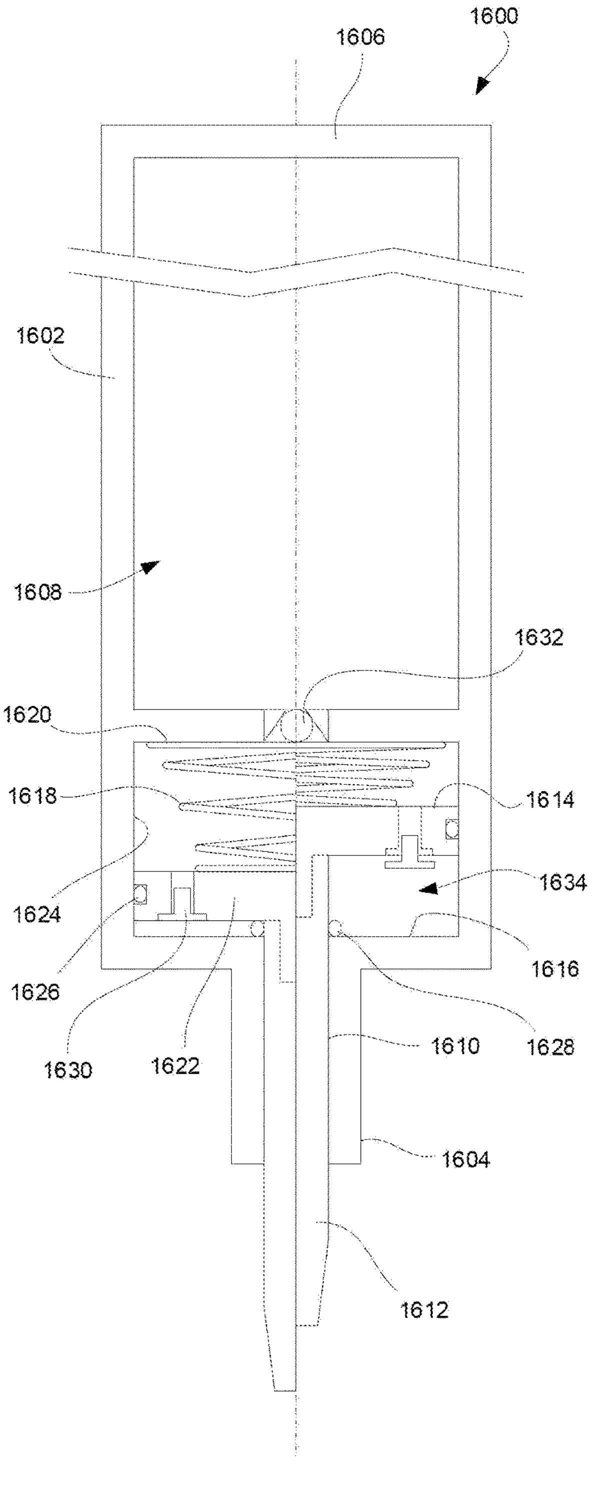
FIG. 16 is a schematic cutaway view of another embodiment of a pen-type applicator of the present invention.

FIG. 16 shows an example of an applicator 1600 that prevents excess dispensing of the flowable material when the wick is retracted, and provides accurate metering of a fixed volume of flowable material upon the wick returning from the retracted position to the extended position. The applicator 1600 has a housing 1602 that extends from a proximal end 1604 to a distal end 1606, and a chamber 1608 for holding a flowable material. A collar (not shown) or other features also may be provided on the housing 1602. A discharge port 1610 connects the chamber 1608 to the exterior environment. A wick 1612 is located in and protrudes from the discharge port 1610. A valve 1614 is operatively attached directly or via intervening parts to the distal end of the wick 1612, to move along with the wick 1612. The wick 1612 is slidable within the discharge port 1610 between an extended position and a retracted position. When the wick 1612 is in the extended position (shown on the left side of FIG. 16), the valve 1614 abuts and seals against a corresponding first wall 1616 (e.g., a wall of the chamber 1608 or a surface of a valve subassembly installed in the applicator 1600) to prevent the flowable material from passing from the chamber 1608 to the wick 1612. When the wick 1612 is in the retracted position (shown on the right side in FIG. 16), the valve 1614 unseats from the first wall 1616 and allows flowable material to pass from the chamber 1608 to the wick 1612. A spring 1618 is located between the valve 1614 and a second wall 1620 (e.g. a wall of the chamber 1608 or a surface of a valve assembly installed in the applicator 1600). The spring 1618 is compressed to generate a resilient biasing force that presses on the valve 1614 to bias the wick 1612 to the extended position.

In this example, the valve 1614 comprises an assembly having a piston 1622 that is connected to move with the wick 1612, and slides within a cylinder 1624. The outer perimeter of the piston 1622 has one or more seals 1626 (e.g., O-rings or wiper seals) that contact the cylinder 1624 to inhibit the flow of flowable material at this sliding intersection. The valve 1614 or the first wall 1616 also may have a face seal 1628 (e.g., an O-ring or packing) to seal off the wick 1612 when the wick 1612 is in the extended position. The piston 1622 includes one or more one-way valves 1630 that are configured to open to allow the flowable material to pass through the piston 1622 when the wick 1612 and piston 1622 are moving from the extended position to the retracted position, and close to prevent the flowable material from passing through the piston 1622 when the wick 1612 and piston 1622 are moving from the retracted position to the extended position.

The one-way valves 1630 may comprise any suitable mechanism that allows flow in one direction, but prevents flow in the other directions. The shown valves 1630 are poppet valves, but other examples include ball valves, flapper valves and reed valves. Such devices typically include a separate or integral spring to hold the valve in the closed position, and the valve and valve seat are shaped such that an excess of hydraulic pressure on one side of the valve forces the valve into the valve seat to maintain the seal, and an excess of hydraulic pressure on the other side of the valve moves the valve away from the seat against the bias of the spring to open the seal. Such devices are conventional, and need not be described in greater detail herein.

The perimeter seals 1626 and the one-way valves 1630 cooperate to form a variable sized chamber 1634 between the piston 1622 and the wick 1612. The chamber 1634 enlarges and fills with flowable material when the wick 1612 moves to the retracted position, and the chamber 1634 shrinks as the wick 1612 moves to the extended position. During this extension, the seals 1626 and one-way valves 1636 generate pressure on the flowable material to force it into the wick 1612. The amount of force depends upon the spring constant of the spring 1618. The size of the chamber 1634 can be selected to provide the desired volume of flowable material during each stroke towards the extended position. If desired, the chamber 1634 also may include a mechanism for changing its volume (e.g., a movable wall) to allow the operator to adjust the dispensing volume. The applicator 1600 also may include a graduated scale to indicate how much volume is dispensed as a function of how far back the operator retracts the wick 1612. Other alternatives and variations will be apparent to persons of ordinary skill in the art in view of the present disclosure.

In this embodiment, the cylinder 1624 optionally may be separated from the remainder of the chamber 1608 by an intermediate wall such as the second wall 1620, and a one-way valve 1632 may be provided in a passage that fluidly connects the chamber 1608 with the piston. The one-way valve 1632 prevents flowable material from leaving the cylinder 1624 as the wick 1612 moves to the retracted position. This helps ensure that the flowable material will be forced through the one-way valves 1630 in the piston 1622 to fill the variable sized chamber 1636.

Figure 17:
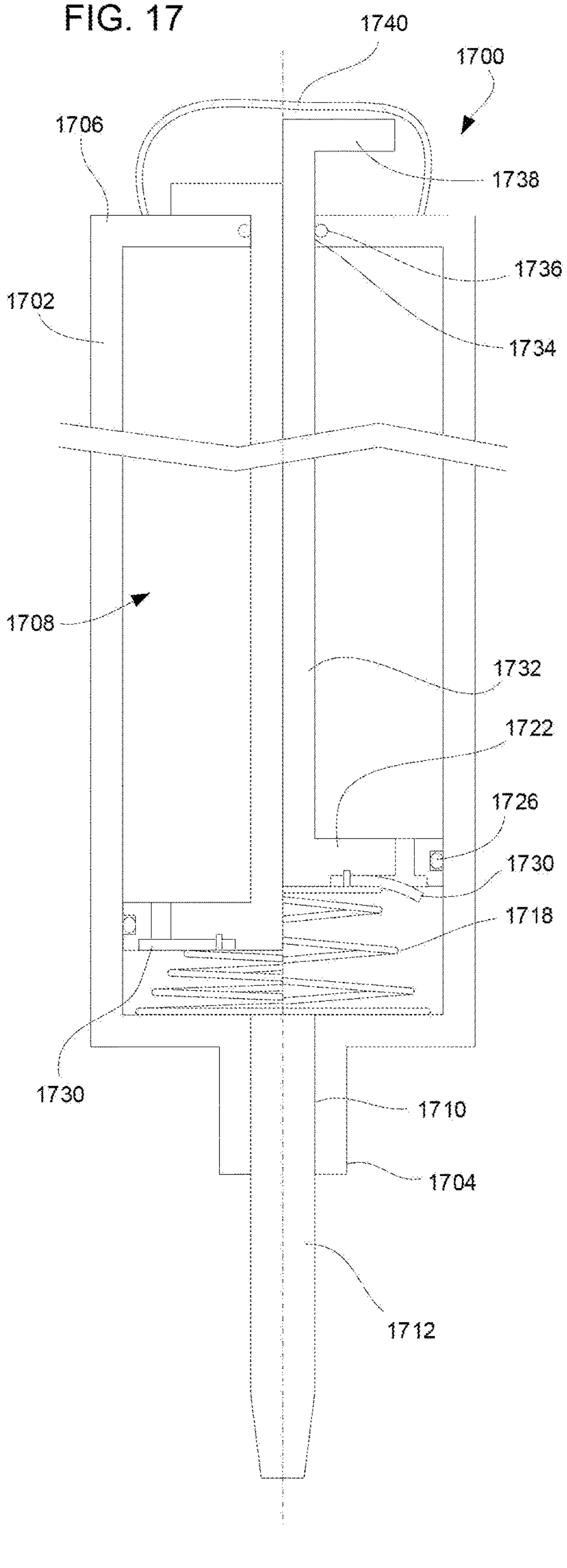
FIG. 17 is a schematic cutaway view of another embodiment of a pen-type applicator of the present invention.

FIG. 17 shows another example of an applicator 1700 that prevents excess dispensing of the flowable material, and provides accurate metering of a fixed volume of flowable material. The applicator 1700 has a housing 1702 that extends from a proximal end 1704 to a distal end 1706, and a chamber 1708 for holding a flowable material. A collar (not shown) or other features also may be provided on the housing 1702. A discharge port 1710 connects the chamber 1708 to the exterior environment. A wick 1712 is located in and protrudes from the discharge port 1710. In this case, the wick 1712 may be rigidly fixed in the discharge port 1710, and the valve is replaced by a movable piston 1722 that slides within the chamber 1708. The piston 1722 acts as a valve. Like the embodiment of FIG. 16, the piston 1722 has perimeter seals 1726 that seal against the chamber wall, and one or more one-way valves 1730 that prevent the flowable material from passing through the piston 1722 when the piston is moving towards the wick 1712, but allow the flowable material to pass through the piston 1722 as the piston is retracted away from the wick 1712. The one-way valves 1730 in this case are shown as a flapper or reed valve (i.e., a flexible cantilevered flap that covers a hole). A spring 1718 is located between the piston 1722 and the wick 1712 and is configured to bias the piston 1722 away from the wick 1712.

The piston 1722 is manually operated by the user to move it against the bias of the spring 1718. Any suitable mechanism may be used to provide such control. For example, the piston 1722 may be connected to a rod 1732 that extends through an opening 1734 at the distal end 1706 of the housing 1702. Seals 1736 (e.g. sliding or gland seals) prevent the flowable material from exiting at the sliding intersection. The rod 1723 may terminate at its distal end with an enlarged button 1738. A flexible membrane 1740 also may be provided to seal the end of rod 1723 and provide an additional measure against flowable material exiting the housing 1702 at this location. In use, the operator depresses the button 1738 to move the piston from the retracted position (shown on the right in FIG. 17) to the extended position (shown on the left in FIG. 17). During this motion, the one-way valves 1730 close, and the flowable medium between the piston 1722 and the wick 1712 is forced into the wick 1712. If desired, an additional flow passage and check valve may be provided between the button 1738 and the piston 1722 to force the flowable material through the one-way valves 1730 in the piston 1722 as the piston moves to the retracted position, such as described in relation to the embodiment of FIG. 16. Other alternatives and variations will be apparent to persons of ordinary skill in the art in view of the present disclosure.

Another problem with current pen-type applicators is that it is impossible to reverse the movement of flowable material away from the wick and back towards the chamber, except by turning over the applicator and depressing the wick. Even then, the wick tends to retain the flowable material by capillary action, and the atmospheric pressure on the exposed side of the wick is insufficient to overcome this capillary action. This problem is addressed, at least in part, by the embodiment of FIGS. 18A and 18B.

Applicator 1800 has a housing 1802 that extends from a proximal end 1804 to a distal end 1806, and a chamber 1808 for holding a flowable material. A collar (not shown) or other features also may be provided on the housing 1802. A discharge port 1810 connects the chamber 1808 to the exterior environment. A wick 1812 is located in and protrudes from the discharge port 1810. In this case, the wick 1812 may be rigidly fixed in the discharge port 1810, and the valve is replaced by a movable piston 1822 that slides within the chamber 1808. Like the embodiment of FIG. 16, the piston 1822 has perimeter seals 1826 that seal against the chamber wall, and one or more first one-way valves 1830 that prevent the flowable material from passing through the piston 1822 when the piston is moving towards the wick 1812, but allow the flowable material to pass through the piston 1822 as the piston is retracted away from the wick 1812. The piston 1822 is moveable by a control rod 1832, and a spring 1818 is provided to bias the piston 1822 away from the wick 1812. Thus, like the embodiment of FIG. 17, the piston 1822 is moved by pressing on the control rod 1832 against the bias of the spring 1818.

Figure 18A:
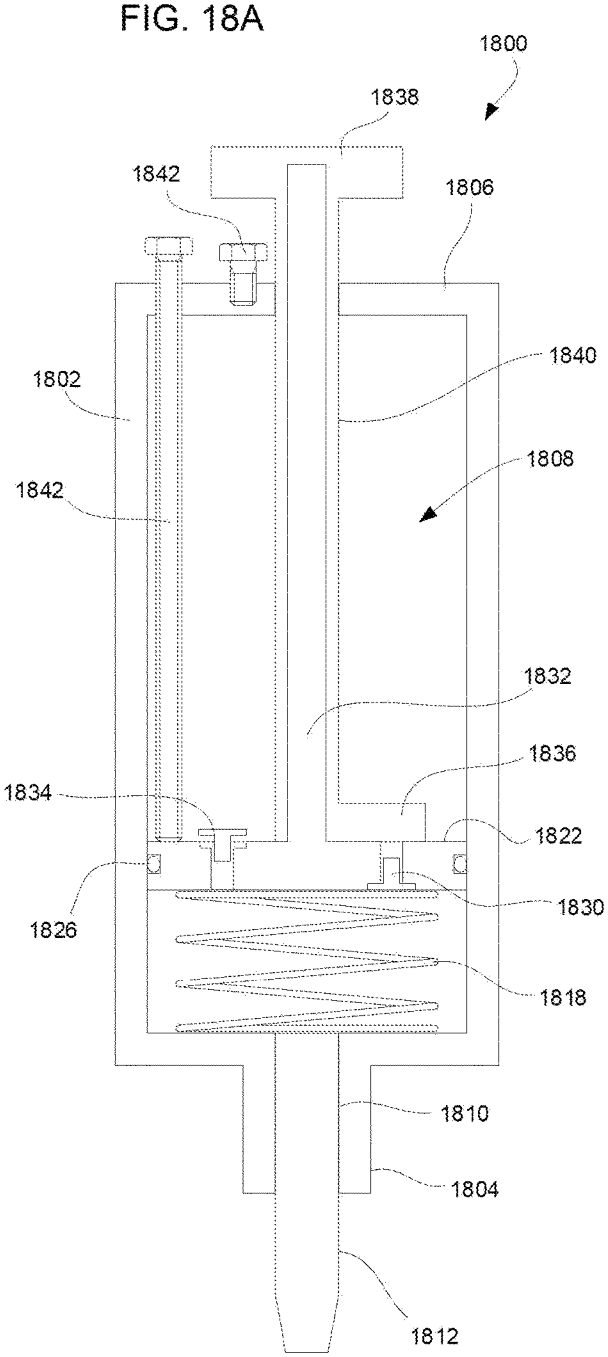
FIGS. 18A and 18B are schematic cutaway views of another embodiment of a pen-type applicator of the present invention.
Figure 18B:
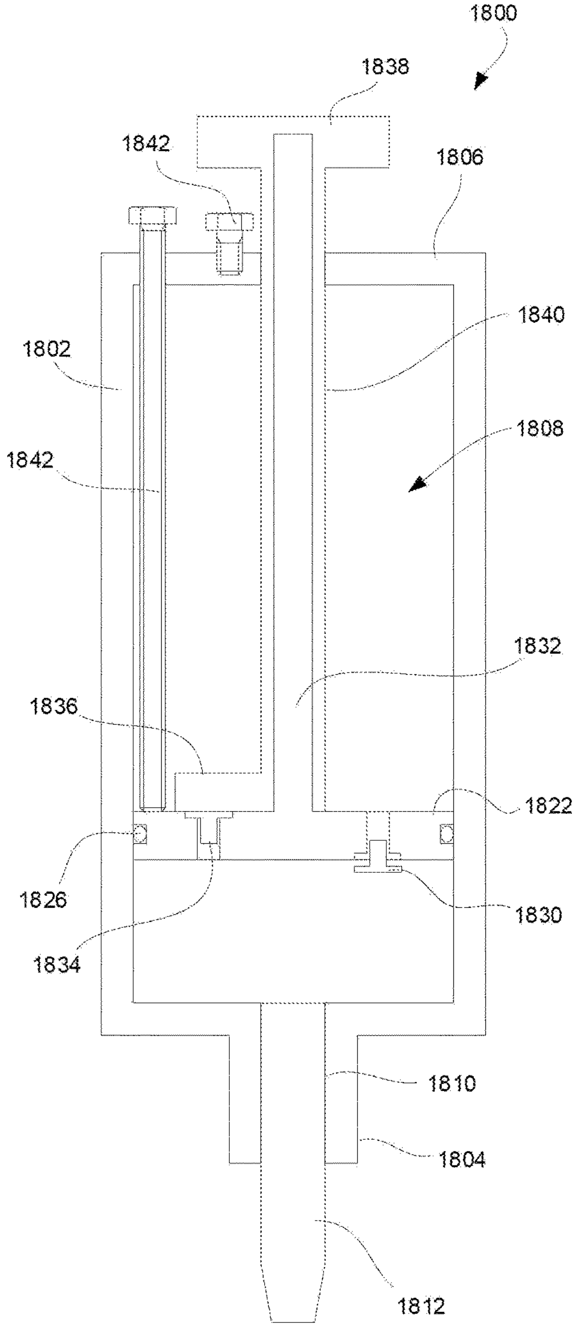

The piston 1822 also has one or more second one-way valves 1834 that are configured in the opposite way as the first one-way valves 1830—that is, the second one-way valves 1834 allow the flowable material to pass through the piston 1822 when the piston 1822 is moving towards the wick 1812, but prevent the flowable material from passing through the piston 1822 when the piston 1822 is moving away from the wick 1812. A valve controller 1836 is provided to selectively enable either the first one-way valves 1830 or the second one-way valves 1834. In this case, the valve controller 1836 comprises a cover that is pivotally attached to the piston control rod 1832, and is connected to a knob 1838 located outside the housing 1802 by a tube 1840 that surrounds the piston control rod 1832. The position of the piston 1822 is controlled by pushing down or pulling up on the knob 1838, and the valve controller 1836 is operated by rotating the knob 1838. When the valve controller 1836 is oriented to overlie the first one-way valves 1830, as shown in FIG. 18A, the first one-way valves 1830 are disabled and the second one-way valves 1834 are enabled. When the valve controller 1836 is oriented to overlie the second one-way valves 1834, as shown in FIG. 18B, the first one-way valves 1830 are enabled and the second one-way valves 1834 are disabled. (FIG. 18B is shown without the spring 1818 to show the open position of the first one-way valve 1830.) In use, the operator can push and pull on the knob 1838 to move the piston towards or away from the wick 1812, and can rotate the knob 1838 to operate the valve controller 1836.

As with the other embodiments, various seals and covers may be provided to prevent the flowable material from leaking around the knob 1838. A fixed travel stop (not shown) may be provided inside the chamber 1802 to prevent the piston 1822 from being retracted farther than desired. One or more adjustable travel stops, such as screws 1842 and 1844 also may be provided to selectively control the piston's range of travel. In this case, a first screw 1842 can be adjusted to control the distance to which the piston 1822 can retract from the wick 1812 (e.g., by abutting the piston 1822), and a second screw 1844 can be adjusted to control the distance to which the piston 1822 can move towards the wick 1812 (e.g., by abutting the knob 1838). Other alternatives and variations will be apparent to persons of ordinary skill in the art in view of the present disclosure.

The embodiment of FIGS. 18A and 18B provides a unique advantage in that it allows the operator to operate the valve controller 1836 and thereby control whether the piston 1822 will pump the flowable material towards or away from the wick 1812. Thus, the operator can pull flowable material away from the wick 1812 when the wick 1812 becomes oversaturated, or when the preparation operation is complete. It will be appreciated that other embodiments can use alternative flow control mechanisms. For example, the rotating plate type flow controller 1836 can be replaced by any suitable alternative mechanism, such as cam-operated pins that extend to lock one one-way valve or the other.

Another problem with conventional pen-type applicators is that they cannot be used to reach into narrow, deep openings, and even if the applicator is made relatively small it may still be unable to reach around certain corners or other obstructions to apply material in certain areas. Such problems may be addressed, at least in part, by the embodiments of FIGS. 19-23.

Figure 19:
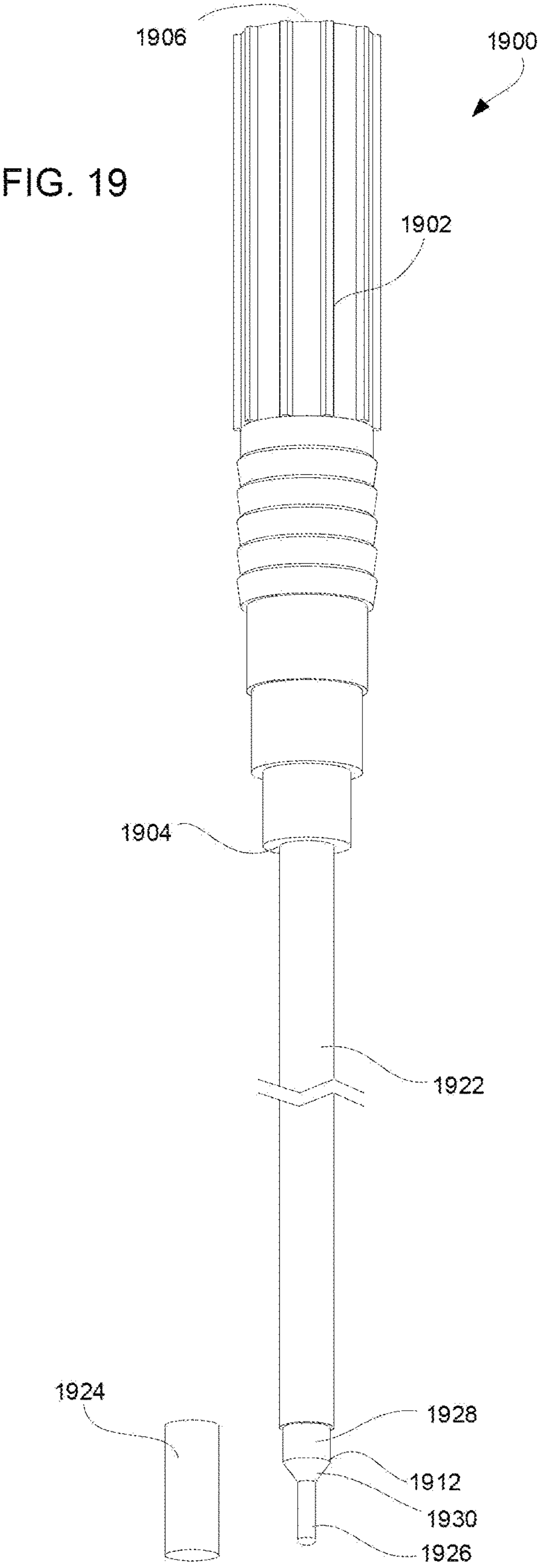
FIG. 19 is a perspective view of another embodiment of a pen-type applicator of the present invention.

FIG. 19 illustrates an applicator 1900 having a housing 1902 that extends from a proximal end 1904 to a distal end 1906, and an extension rod 1922 extending from the proximal end 1904. A wick 1912 extends from a proximal end of the extension rod 1922. The applicator 1900 also includes other features such as a chamber to hold the flowable material, a valve, and so on. The extension rod 1922 comprises a physical extension of the housing 1902, and may be rigid or have some flexibility to allow the user to accurately direct the wick 1912 into narrow spaces. The housing 1902 may include one or more types of ribs, such as those described in relation to FIG. 9, to enhance the user's control of the applicator 1900. Any suitable trigger mechanism may be provided to actuate the internal valve to dispense the flowable material. For example, the wick 1912 may extend the full length of the extension rod 1922, and be movable to activate a valve located in the housing 1902. As another example, the wick 1912 may be slidingly retained just at the end of the extension rod 1922, and provided with a pushrod to activate a valve located in the housing 1902. As still another example, the valve may be located at the proximal end of the extension housing, adjacent the wick 1912, to allow more localized operation by the wick 1912. Alternatively, the extension rod 1922 may be a hollow tube with the wick 1912 fixed in the lumen of the tube and the valve may be located in the housing or in the tube near the tip, with the valve being actuated by a trigger on the housing or on the tube. As with other embodiments, a cap 1924 may be provided to cover the wick 1912 when the device is not in use.

The embodiment of FIG. 19 provides an advantage when treating surfaces that are in deep recesses. This functionality is enhanced by making the extension rod 1922 relatively narrow as compared to the housing 1902, and not significantly larger than (and preferably approximately the same diameter as) the wick 1912. In this example, the extension rod 1922 is no more than about 20% larger, and more preferably no more than 10% larger, in diameter than the largest diameter of the wick 1912. Alternatively, the wick 1912 may be similar to that of FIG. 7, extending beyond the diameter of the rod by 1-50% or more preferably no more than 10%.

FIG. 19 also shows an alternative embodiment of a wick 1912, in which the wick 1912 has a stepped shape. The proximal tip 1926 of the wick 1912 is relatively small, and flexible to bend over to fit into narrow spaces and corners, whereas the distal end 1928 of the wick 1912 is relatively large, and stiff enough to be pressed against surfaces with some force to activate the valve and deposit the flowable material. A transitional portion 1930 of the wick 1912 between the proximal tip 1926 and distal end 1928 optionally may be shaped to address particular features that might be encountered during use of the applicator 1900. For example, the transitional portion 1930 might be tapered to facilitate applying the flowable material to chamfered openings that receive corresponding conical fastener heads for flush seating of the fastener head. Other embodiments may use more than one proximal tip 1926. For example, the wick 1912 may have multiple flexible "fingers" extending from it in one or more directions. Other alternatives and variations will be apparent to persons of ordinary skill in the art in view of the present disclosure. Such wicks may be used in any of the other embodiments described herein.

Figure 20:
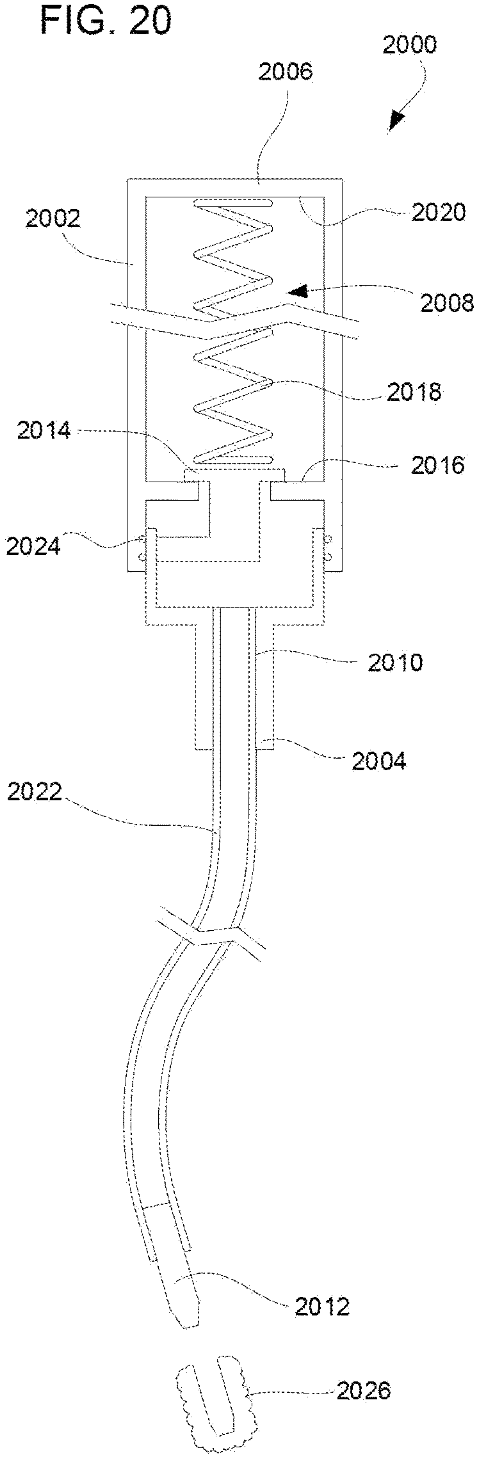
FIG. 20 is a schematic cutaway view of another embodiment of a pen-type applicator of the present invention.

FIG. 20 shows another embodiment of an applicator 2000 intended to treat remote or relatively hard to reach surfaces. Here, the applicator 2000 has a housing 2002 that extends from a proximal end 2004 to a distal end 2006, with a chamber 2008 for holding flowable material. A collar (not shown) or other features also may be provided on the housing 2002. A discharge port 2010 connects the chamber 2008 to the exterior environment. A flexible hollow tube 2022 extends from the discharge port 2010, and a wick 2012 is located in and protrudes from the flexible tube's lumen. A valve 2014 is operatively attached at the proximal end 2004 of the housing 2002, and the proximal end 2004 of the housing 2002 is movable relative to the distal end 2006 of the housing 2002. For example, the proximal end 2004 may comprise a piston-like structure that fits into a cylinder-like structure formed in the distal end 2006. Seals 2024 may be provided to prevent leaking at this sliding junction. When the distal end 2002 is in an extended position, the valve 2014 abuts and seals against a corresponding first wall 2016 (e.g., a wall of the chamber 2008 or a surface of a valve subassembly installed in the applicator 2000) to prevent the flowable material from passing from the chamber 2008 to the wick 2012. When the proximal end 2004 is in the retracted position, the valve 2014 unseats from the first wall 2016 and allows flowable material to pass from the chamber 2008 to the wick 2012. A spring 2018 is located between the valve 2014 and a second wall 2020 (e.g. a wall of the chamber 2008 or a surface of a valve assembly installed in the applicator 2000). The spring 2018 is compressed to generate a resilient biasing force that presses on the valve 2014 to bias the proximal end 2004 to the extended position.

In use, the operator may use one hand to squeeze the housing 2002 to move the proximal end 2004 towards the distal end 2006. This movement unseats the valve 2014 against the bias of a spring 2018, and allows the flowable material to pass from the chamber 2008 to the wick 2012, thereby wetting the wick 2012. When the user releases pressure, the spring 2018 moves the proximal end 2004 and distal end 2006 apart to again seat the valve and seal the applicator 2000. The user may then direct the wick 2012 into contact with the surface to be coated by moving the whole applicator 2000, or by gripping and manipulating the tube near the wick 2012.

This embodiment provides a relatively simple construction for an applicator 2000 having a flexibly-mounted wick 2012. The lumen 2022 may comprise any suitable material, such as flexible polymers or rubber. The lumen 2022 also may be filled with wick material, or filled with capillary tubes to inhibit free flowing of flowable material from the wick 2012 when the device is not in use. As with other embodiments, a pliable cover 2026 may be provided over the wick 2012 and may be useful to treat in narrow cracks or holes, or other confined spaces with uneven surfaces in which the wick 2012 might not be maneuvered, or be pliant enough to conform to surface irregularities.

FIGS. 21A and 21B illustrate another embodiment of an applicator 2100 intended to treat remote or relatively hard to reach surfaces. Here, the applicator 2100 has a housing 2102 that extends from a proximal end 2104 to a distal end 2106, with a chamber 2108 for holding flowable material. A collar (not shown) or other features also may be provided on the housing 2102. A discharge port 2110 connects the chamber 2108 to the exterior environment. A flexible lumen 2122 extends from the discharge port 2110, and a wick 2112 is located in and protrudes from the flexible lumen 2122. A valve 2114 is provided in the housing 2102 to selectively block the flow of flowable material from the chamber 2108 to the wick 2112. In this case, the valve 2114 is operated by a trigger 2124 located on the side of the housing 2102. The valve 2114 is movable between a first position (FIG. 21A) and a second position (FIG. 21B). In the first position, valve 2114 abuts and seals against a corresponding first wall 2116 (e.g., a wall of the chamber 2108 or a surface of a valve subassembly installed in the applicator 2100) to prevent the flowable material from passing from the chamber 2108 to the wick 2112. In the second position, the valve 2114 is unseated from the first wall 2116 and allows flowable material to pass from the chamber 2108 to the wick 2112. A spring 2118 is located between the valve 2114 and a second wall 2120 (e.g. a wall of the chamber 2108 or a surface of a valve assembly installed in the applicator 2100). The spring 2118 is compressed to generate a resilient biasing force that presses on the valve 2114 to bias the valve 2114 to the first position.

The trigger 2124 may comprise any suitable mechanism. For example, in the shown embodiment, the trigger 2124 comprises a cam 2126 connected to the valve 2114, and a cam driver 2128 movably mounted to the housing 2102. The cam driver 2128 is a structure that abuts the cam 2126. The cam driver 2128 is movable between a first position (FIG. 21A) in which the cam driver 2128 allows the valve 2114 to move to the first (i.e., closed) position, and a second position (FIG. 21B) in which the cam driver 2128 pushes on the cam 2126 to hold the valve 2114 in the second (i.e., closed) position. The cam driver 2128 may be pivotally, slidably, rotatably or otherwise movably mounted to the housing 2102. In this case, the cam driver 2128 is pivotally mounted to the housing, and a return spring 2130 may be provided to bias the cam driver 2128 to the first position. Any suitable seals may be used to prevent leaking of the flowable material around the trigger components. In this case, a seal is provided by a flexible cover 2132 that overlies the cam driver 2128. In use, an operator presses on the cam driver 2128 to open the valve 2114 and dispense the flowable material to the wick 2112.

FIGS. 22A and 22B illustrate another embodiment of an applicator 2200 intended to treat remote or relatively hard to reach surfaces. Here, the applicator 2200 has a housing 2202 that extends from a proximal end 2204 to a distal end 2206, with a chamber 2208 for holding flowable material. A collar (not shown) or other features also may be provided on the housing 2202. A discharge port 2210 connects the chamber 2208 to the exterior environment. A flexible tube 2222 extends from the discharge port 2210, to a valve assembly 2224. A wick 2212 protrudes from the valve assembly 2224. The valve assembly 2224 is configured to selectively block the flow of flowable material from the tube 2222 to the wick 2212. In this case, the valve assembly 2224 includes a valve 2214 that movable between a first position (FIG. 22A) and a second position (FIG. 22B). In the first position, valve 2214 abuts and seals against a corresponding first wall 2216 to prevent the flowable material from passing to the wick 2212. In the second position, the valve 2214 is unseated from the first wall 2216 and allows flowable material to pass to the wick 2212. A spring 2218 is located between the valve 2214 and a second wall 2220. The spring 2218 is compressed to generate a resilient biasing force that presses on the valve 2214 to bias the valve 2214 to the first position.

The valve assembly 2224 includes any mechanism suitable to operate the valve 2214. For example, in the shown embodiment, the valve assembly 2224 comprises a cam 2226 connected to the valve 2214, and a cam driver 2228 movably mounted to the trigger assembly 2224. The cam driver 2228 is a structure that abuts the cam 2226. The cam driver 2228 is movable between a first position (FIG. 22A) in which the cam driver 2228 allows the valve 2214 to move to the first (i.e., closed) position, and a second position (FIG. 22B) in which the cam driver 2228 pushes on the cam 2226 to hold the valve 2214 in the second (i.e., closed) position. The cam driver 2228 may be pivotally, slidably, rotatably or otherwise movably mounted to the valve assembly 2224. In this case, the cam driver 2228 is pivotally mounted to the valve assembly 2224. A return spring (not shown) may be provided to bias the cam driver 2228 to the first position, or such return motion may be provided by the biasing force of the spring 2218 acting on the cam 2226. Any suitable seals may be used to prevent leaking of the flowable material around the trigger assembly components.

The applicator 2200 of FIGS. 22A and 22B is expected to be particularly useful for providing one-handed operation of the applicator 2200. For example, the trigger assembly 2224 may be configured as a small, rigid housing that the operator can actuate to wet the wick 2212 with flowable material and then manipulate the tube 2222 to direct the wick 2212 to the desired treatment location, and then operate the valve 2214 to dispense more flowable material as needed. The housing 2202 can then be attached to a nearby structure (e.g., scaffolding or a ladder), or to a carrier or the operator's body (e.g., via a wrist cuff or the like), preferably to facilitate gravity feed of the flowable material. If desired, a second valve can be provided on the housing 2202 to provide a flow cutoff at the housing 2202.

It will also be appreciated that the side-operated trigger shown in FIGS. 22A and 22B may be replaced by other trigger mechanisms to operate the valve 2214. For example, the valve assembly 2224 may be configured with a pistol-type grip and trigger. Other alternatives and variations will be apparent to persons of ordinary skill in the art in view of the present disclosure.

Figure 23:
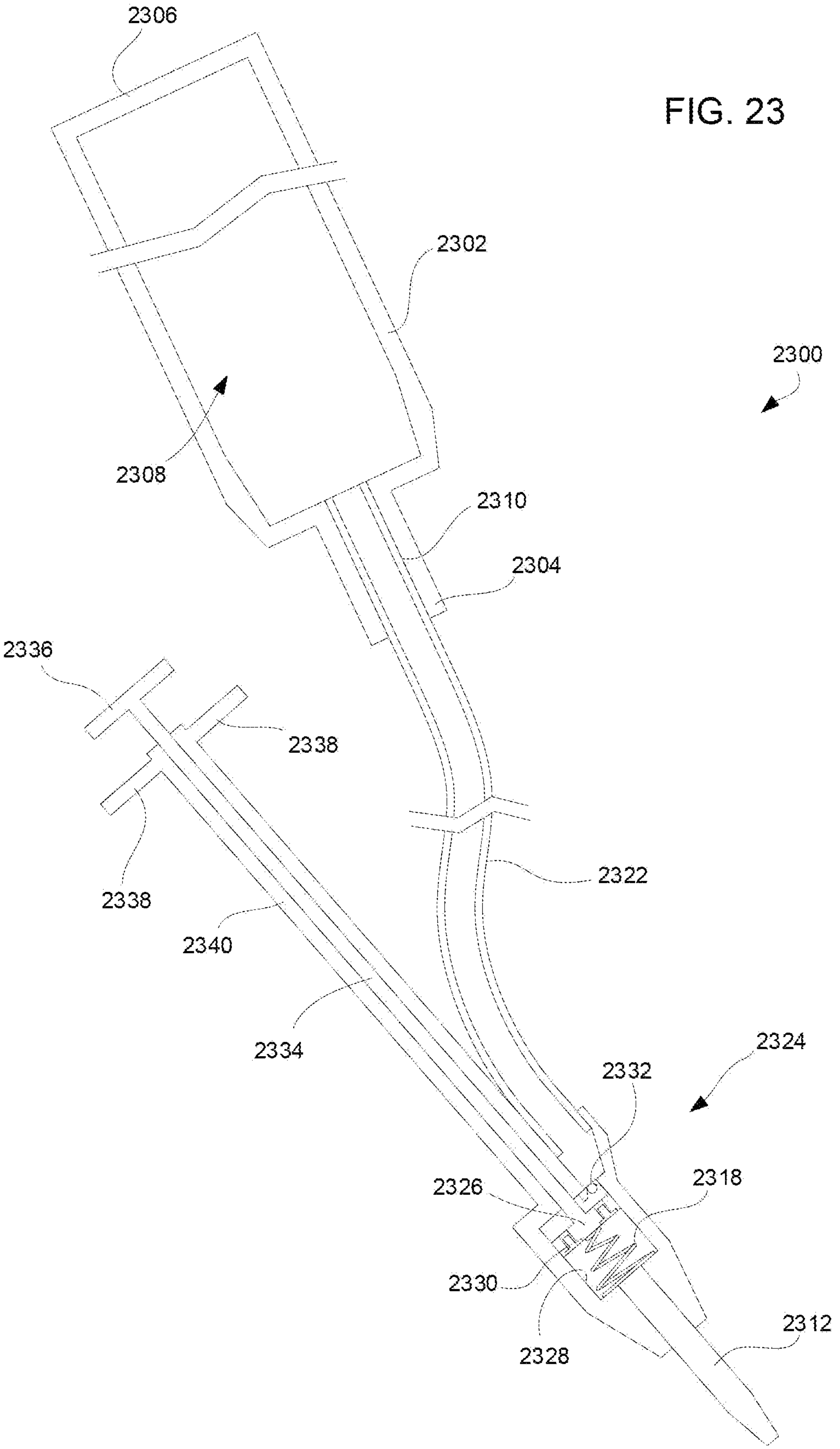
FIG. 23 is a schematic cutaway view of another embodiment of a pen-type applicator of the present invention.

FIG. 23 illustrates another embodiment of an applicator 2300 intended to treat remote or relatively hard to reach surfaces. Here, the applicator 2300 has a housing 2302 that extends from a proximal end 2304 to a distal end 2306, with a chamber 2308 for holding flowable material. A collar (not shown) or other features also may be provided on the housing 2302. A discharge port 2310 connects the chamber 2308 to the exterior environment. A flexible lumen 2322 extends from the discharge port 2310, to a valve assembly 2324. A wick 2312 protrudes from the valve assembly 2324. The valve assembly 2324 is configured to selectively block the flow of flowable material from the lumen 2322 to the wick 2312. In this case, the valve assembly 2324 includes a piston 2326 that slides in a cylinder 2328. The piston 2326 is sealed against the cylinder 2328 by perimeter seals (not shown), and has one or more one-way valves 2330 that permit flowable material to pass from the lumen 2322 towards the wick 2312, but prevent the flowable material from going in the other direction. A spring 2318 is located in the cylinder 2328, and configured to bias the piston 2326 away from the wick 2312. A check valve 2332 connects the lumen 2322 to the cylinder 2328, and is configured to allow the flowable material to pass from the lumen 2322 to the cylinder 2328, but prevents flow in the opposite direction.

The trigger assembly 2324 also includes a pushrod 2334, which extends from the piston 2326 to a plunger 2336 located where it is accessible to the operator. One or more triggers 2338 may be located on the trigger assembly 2324 adjacent to the plunger 2336. The piston 2326 is operated by gripping the plunger 2336 and triggers 2338 in one hand and squeezing them together to overcome the bias of the spring 2318. This moves the piston 2326 towards the wick 2312, while the one-way valves 2330 remain closed, thus forcing the flowable material towards the wick 2312. When the plunger 2336 and triggers 2338 are released, the spring 2318 moves the piston 2326 away from the wick 2312 and the one-way valves 2330 open to allow flowable material to pass therethrough. During the return stroke, the check valve 2332 closes to prevent the flowable material flowing out of the cylinder 2328 and into the lumen 2322.

The use of a trigger assembly 2324 such as this at the end of the lumen 2322 is expected to provide a benefit of controlling the flow of flowable material, while minimizing the amount of flowable material that remains between the valve and the wick 2312. This reduces the amount of flowable material that could potentially escape from the applicator 2300 when it is not in use.

If desired, the trigger assembly 2324 may comprise or be shaped as an extension rod 2340 that provides remote operation and control of the wick 2312. For example, in the embodiment of FIG. 23, the operator may hold the plunger 2336 and triggers 2338 and use these to manipulate the wick 2312 into narrow spaces and under overhangs.

Figure 24:
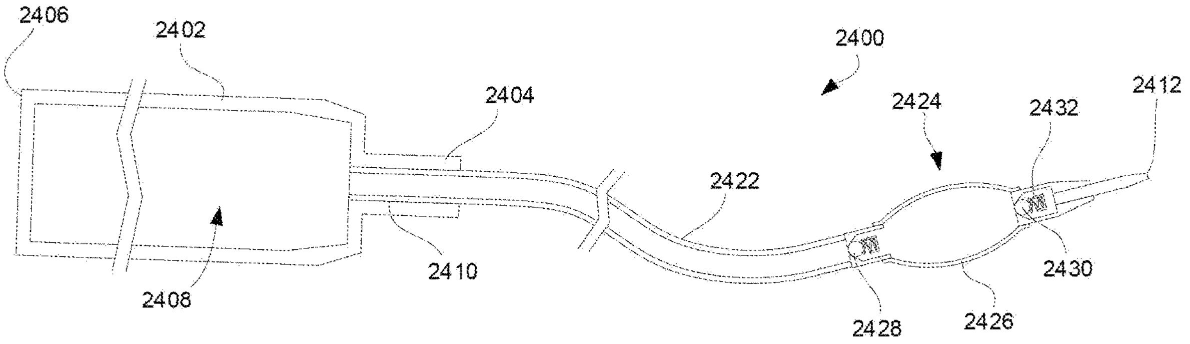
FIG. 24 is a schematic cutaway view of another embodiment of a pen-type applicator of the present invention.

FIG. 24 illustrates another embodiment of an applicator 2400 intended to treat remote or relatively hard to reach surfaces. Here, the applicator 2400 has a housing 2402 that extends from a proximal end 2404 to a distal end 2406, with a chamber 2408 for holding flowable material. A collar (not shown) or other features also may be provided on the housing 2402. A discharge port 2410 connects the chamber 2408 to the exterior environment. A flexible lumen 2422 extends from the discharge port 2410, to a valve assembly 2424. A wick 2412 protrudes from the valve assembly 2424. The valve assembly 2424 is configured to selectively block the flow of flowable material from the lumen 2422 to the wick 2412. In this case, the valve assembly 2424 comprises a flexible chamber 2426 located between an upstream check valve 2428 and a downstream check valve 2430. The chamber can be squeezed by the operator to force its contents past the downstream check valve 2430 and to the wick 2412. During this squeezing, the upstream check valve 2428 prevents the flowable material from passing back to the flexible lumen 2422. When the chamber 2426 is released, it resumes its original shape, and is refilled by pulling flowable material through the upstream check valve 2428. The check valves 2428, 2430 may comprise any suitable one-way valve. The downstream check valve 2430 preferably comprises a one-way valve that is normally biased to the closed position by a spring 2432 or the like to prevent it from leaking fluid when there is no squeezing pressure applied to the chamber 2426. The shown chamber 2426 comprises a bulb-type chamber that is flexible around its entire perimeter. Alternative chambers 2426 may be only partially flexible, such as the chamber described in relation to FIG. 14 herein.

The use of a valve at the end of the flexible lumen, such as shown in FIGS. 22A through 24, is expected to provide a benefit of controlling the flow of flowable material, while minimizing the amount of flowable material that remains between the valve and the wick. This reduces the amount of flowable material that could potentially escape from the applicator when it is not in use. However, in each case, the applicator may be modified to include a valve in the housing, such as shown in FIGS. 20-21B, to provide a redundant flow control mechanism. It will also be understood that the valve mechanisms shown in FIGS. 22A through 24 could be used in embodiments that do not have a flexible lumen. For example, the bulb-type chamber 2426 and associated valves of FIG. 24 may be mounted directly to the proximal end of a housing without an intervening flexible lumen.

Figure 25:
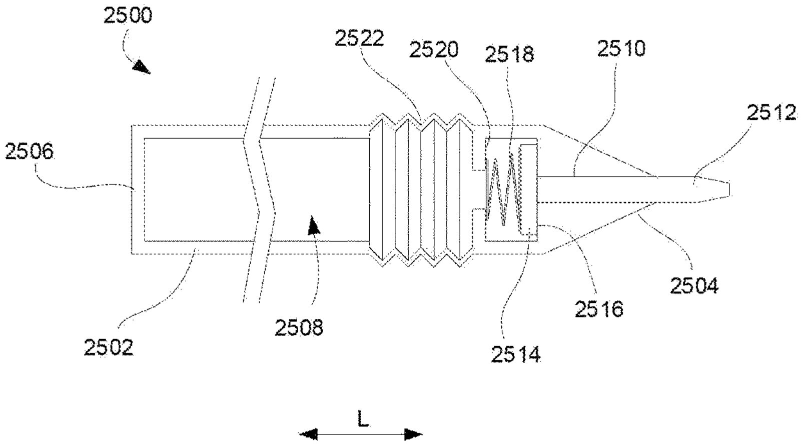
FIG. 25 is a schematic cutaway view of another embodiment of a pen-type applicator of the present invention.

FIG. 25 illustrates another embodiment of applicator 2500 that is configured for use in confined spaces. The applicator 2500 has a housing 2502 that extends from a proximal end 2504 to a distal end 2506, and a chamber 2508 for holding a flowable material. A collar (not shown) or other features also may be provided on the housing 2502. A discharge port 2510 connects the chamber 2508 to the exterior environment. A wick 2512 is located in and protrudes from the discharge port 2510. A valve 2514 is operatively attached directly or via intervening parts to the distal end of the wick 2512, to move along with the wick 2512. The wick 2512 is slidable within the discharge port 2510 between an extended position and a retracted position. When the wick 2512 is in the extended position, the valve 2514 abuts and seals against a corresponding first wall 2516 (e.g., a wall of the chamber 2508 or a surface of a valve subassembly installed in the applicator 2500) to prevent the flowable material from passing from the chamber 2508 to the wick 2512. When the wick 2512 is in the retracted position, the valve 2514 unseats from the first wall 2516 and allows flowable material to pass from the chamber 2508 to the wick 2512. A spring 2518 is located between the valve 2514 and a second wall 2520 (e.g. a wall of the chamber 2508 or a surface of a valve assembly installed in the applicator 2500). The spring 2518 is compressed to generate a resilient biasing force that presses on the valve 2514 to bias the wick 2512 to the extended position.

In this example, the discharge housing 2502 comprises a flexible section 2522 located between the distal end 2506 of the housing 2502 and the proximal end 2504 of the housing 2502. The flexible section 2522 comprises a region in which the housing 2502 is sufficiently flexible to allow the proximal end 2504, and thus the wick 2512, to be reoriented relative to the distal end 2506. The flexible section 2522 may comprise, for example, a bellows-shaped cylindrical portion of the housing 2502 located between the valve 2514 and the distal end 2506. In this case, the wick 2512 and valve 2514 may be reoriented by bending the bellows. The bellows may comprise an integrally-formed portion of the housing 2502, and it may have a reduced wall thickness to facilitate bending. The bellows or other flexible section 2522 alternatively may comprise a separate part, such as a flexible boot, that is attached to the remainder of the housing. Other alternatives and variations will be apparent to persons of ordinary skill in the art in view of the present disclosure.

It will be understood that all or none of the foregoing embodiments may be used with undersized wicks, and this feature is not specifically required of any embodiment.

It will also be understood that the features described herein are illustrated in exemplary schematic configurations, and that embodiments might include more elaborate mechanisms or mechanisms having different shapes and sizes. For example, the valve mechanisms shown herein are generally shown in schematic form, but they may be replaced by any suitable corresponding mechanism or subassembly having any number of operating parts. Non-limiting examples of alternative valve mechanisms are described in U.S. Pat. Nos. 5,702,759; 4,848,947; 4,685,820; and 4,792,252, which are incorporated herein by reference. As another example, various fasteners or connecting parts may be provided to attach the parts to one another. For example, retainer clips, pins, adhesive bonds, or the like may be provided to hold the valve to the wick where it is necessary for the parts to move in unison, and the wick or other moving parts may have other features to prevent extension or contraction beyond the desired limits of travel. As another example, the springs discussed in the various embodiments may comprise any suitable spring, with exemplary options being: untapered and tapered helical springs, Bellville washer type springs, cantilevered leaf springs, elastomeric blocks, and so on. The springs also may be mounted to act in compression or in tension. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary and are not intended to limit the scope of the claims. It will also be appreciated that the inventions described herein can be modified and adapted in various ways, and all such modifications and adaptations are intended to be included in the scope of this disclosure.

What is claimed is:

1. An applicator comprising:

a housing (302, 402, 502, 602, 702, 802, 902, 1002, 1102, 1902) having a chamber (308, 408, 508, 608, 708, 808, 1008, 1108), a discharge port (310, 410, 510, 610, 710, 810, 1010, 1110), and a valve (314, 414, 514, 614, 714, 814, 1014, 1114) movable between a closed position in which the discharge port is not in fluid communication with the chamber, and an open position in which the discharge port is in fluid communication with the chamber, and a valve spring (318, 418, 518, 618, 718, 818, 1018, 1118) configured to bias the valve towards the closed position; and a wick (312, 412, 512, 612, 712, 812, 912, 1012, 1112, 1912) movably connected to the housing and configured to transmit an axial load to the valve to move the valve from the closed position to the open position, the wick comprising a material suitable to receive a fluid from the discharge port and pass the fluid to a location outside the housing;

wherein the applicator is characterized by:

means for supporting and/or increasing a stiffness of the wick (322, 422, 522, 622, 722, 824, 922, 1021, 1124, 1922, 1930);

wherein the means for supporting and/or increasing the stiffness of the wick comprises a tube (322, 522, 622, 824, 922, 1922) surrounding at least a portion of the wick;

wherein the wick is mounted to the tube to be movable between an extended position and a retracted position, and a wick spring (526) is operatively positioned between the wick and the tube and configured to bias the wick to the extended position; and wherein the wick spring has a lower spring constant than the valve spring.

2. The applicator of claim 1, wherein the tube surrounding the wick comprises one or more lateral openings (324, 530, 626, 924) extending through a wall of the tube.

3. The applicator of claim 2, wherein the one or more lateral openings are positioned outside the housing.

4. The applicator of claim 2, wherein the one or more lateral openings are positioned inside the housing.

5. The applicator of claim 1, wherein the tube comprises a trigger (624) located outside the housing and configured to be operated to move the valve from the closed position to the open position.

6. The applicator of claim 5, wherein the housing further comprises a grip surface (628) spaced from the trigger and configured to be held to hold the housing against a force applied to the trigger.

7. The applicator of claim 1, wherein the wick comprises a one of a selection of different wicks (812', 812'', 812''', 812'''', 812'''''), the different wicks being interchangeably connectable to the tube.

8. The applicator of claim 1, wherein the housing comprises a tip portion (1004) and a handle portion (1006), and the tip portion is movable relative to the handle portion.

9. The applicator of claim 8, wherein the tip portion is attached to the handle portion by a rotating connection (1022).

10. The applicator of claim 1, wherein the means for supporting and/or increasing the stiffness of the wick comprises an inner bundle of fibers forming a first portion of the wick having a stiffness greater than a second portion of the wick comprising an outer layer.

11. The applicator of claim 1, wherein the applicator is characterized by:

means for positioning the wick at a nonzero angle relative to at least a portion of the housing, optionally the nonzero angle is greater than or equal to 1 degree relative to a longitudinal direction "L" of the housing and the means for positioning the wick relative to at least a portion of the housing comprises a proximal portion (1004, 2504) of the housing that is movable relative to a distal portion (1006, 2506) of the housing.

12. The applicator of claim 11, wherein the proximal portion of the housing is connected to the distal portion of the housing by a rotating connection (1022) or flexible section (2522).

13. The applicator of claim 11, wherein the means for positioning the wick at a nonzero angle relative to at least a portion of the housing comprises a proximal portion (1204) of the housing that is fixed at the nonzero angle relative to a distal portion (1206) of the housing, the discharge port 1210 and wick 1212 are oriented along an axis A that is angled relative to the longitudinal direction L, optionally the valve 1214 and spring 1218 are also oriented along axis A.

14. The applicator of claim 11, further comprising means for regulating the volume of flow comprising a flexible wall of the chamber (1008, 1208, 2008, 2108, 2208, 2308, 2408, 2508), the flexible wall being configured to be compressed to increase the volume of flow.

15. The applicator of claim 14, wherein the housing (1002, 1202, 2002, 2102, 2202, 2302, 2402, 2502) comprises a flexible bottle forming the flexible wall, or a portion of the housing comprises a flexible membrane forming the flexible wall.

16. A method of applying metal pretreatment material to an intricate geometry of a metal surface, the method comprising steps of: contacting the intricate geometry of the metal surface with the wick of the applicator according to claim 1, wherein said wick receives a metal pretreatment fluid from the discharge port and passes the metal pretreatment fluid to the contacted metal surface;

wherein the applicator optionally further comprises one or more of:

means for regulating a volume of flow from the chamber to the wick;

means for positioning the wick at a nonzero angle relative to at least a portion of the housing.

* * * * *